United States Patent
Caspi et al.

(10) Patent No.: US 12,450,173 B2
(45) Date of Patent: Oct. 21, 2025

(54) METHOD AND APPARATUS TO SET GUEST PHYSICAL ADDRESS MAPPING ATTRIBUTES FOR TRUSTED DOMAIN

(71) Applicant: Intel Corporation, Santa Clara, CA (US)

(72) Inventors: Dror Caspi, Kiryat Yam (IL); Ravi Sahita, Portland, OR (US); Kunal Mehta, Hillsboro, OR (US); Tin-Cheung Kung, Folsom, CA (US); Hormuzd Khosravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 655 days.

(21) Appl. No.: 17/554,190

(22) Filed: Dec. 17, 2021

(65) Prior Publication Data
US 2023/0195652 A1    Jun. 22, 2023

(51) Int. Cl.
*G06F 12/00* (2006.01)
*G06F 9/455* (2018.01)
(Continued)

(52) U.S. Cl.
CPC ...... *G06F 12/1408* (2013.01); *G06F 9/45558* (2013.01); *G06F 12/0646* (2013.01);
(Continued)

(58) Field of Classification Search
CPC ............. G06F 12/1408; G06F 9/45558; G06F 12/0646; G06F 2009/45583;
(Continued)

(56) References Cited

U.S. PATENT DOCUMENTS

| 2017/0220466 A1* | 8/2017 | Gupta | .................. G06F 12/084 |
| 2018/0074969 A1* | 3/2018 | Neiger | ................ G06F 12/1009 |

(Continued)

FOREIGN PATENT DOCUMENTS

EP    4020237 A1 *    6/2022    ........... G06F 3/0644

OTHER PUBLICATIONS

Intention to Grant, EP App. No. 22207950.1, Sep. 19, 2024, 6 pages.
(Continued)

*Primary Examiner* — Tim T Vo
*Assistant Examiner* — Mohammad S Hasan
(74) *Attorney, Agent, or Firm* — NICHOLSON DE VOS WEBSTER & ELLIOTT LLP

(57) ABSTRACT

Methods and apparatus to set guest physical address mapping attributes for a trusted domain In one embodiment, the method includes executing a first one or more of instructions to establish a trusted domain and executing a second one or more of the instructions to add a first memory page to the trusted domain, where the first memory page is private to the trusted domain and a first set of page attributes is set for the first memory page based on the second one or more of the instructions, where the first set of page attributes indicates how the first memory page is mapped in a secure extended page table. The method further includes storing the first set of page attributes for the first memory page in the secure extended page table at a storage location responsive to executing the second one or more of the instructions.

13 Claims, 21 Drawing Sheets

(51) Int. Cl.
  *G06F 12/06* (2006.01)
  *G06F 12/14* (2006.01)
(52) U.S. Cl.
  CPC .............. *G06F 2009/45583* (2013.01); *G06F 2212/1052* (2013.01)
(58) Field of Classification Search
  CPC ......... G06F 2212/1052; G06F 12/1475; G06F 2212/151; G06F 2212/651; G06F 12/109; G06F 12/1009; G06F 12/0882
  See application file for complete search history.

(56) References Cited

U.S. PATENT DOCUMENTS

| | | | | |
|---|---|---|---|---|
| 2019/0042299 | A1* | 2/2019 | Neiger | G06F 12/1475 |
| 2019/0042463 | A1* | 2/2019 | Shanbhogue | G06F 12/1408 |
| 2019/0087575 | A1* | 3/2019 | Sahita | G06F 21/71 |
| 2020/0201786 | A1* | 6/2020 | Ouziel | G06F 12/0246 |
| 2020/0409734 | A1* | 12/2020 | Sahita | G06F 9/50 |
| 2021/0089466 | A1 | 3/2021 | Shanbhogue et al. | |

OTHER PUBLICATIONS

European Search Report and Search Opinion, EP App. No. 22207950.1, May 26, 2023, 10 pages.
Intel Corporation, "Architecture Specification: Intel Trust Domain Extensions (Intel TDX) Module", Available Online at <https://web.archive.org/web/20211021232330if_/https://www.intel.com/content/dam/develop/external/us/en/documents/tdx-module-1.0-public-spec-v0.931.pdf>, Oct. 21, 2021, pp. 1-304.
Extended European Search Report, EP App. No. 25156728.5, Jun. 30, 2025, 10 pages.
Intel, "Architecture Specification: Intel® Trust Domain Extensions (Intel® TDX) Module", Aug. 2021, 17 pages.

\* cited by examiner

METHOD AND APPARATUS TO SET GUEST PHYSICAL ADDRESS MAPPING ATTRIBUTES FOR TRUSTED DOMAIN

TECHNICAL FIELD

Embodiments of the invention relate to the field of computing system; and more specifically, the embodiments are related to an apparatus and method for secure memory access using trusted domains.

BACKGROUND ART

In computing, a virtual machine (VM) is an emulation of a computer system. VMs are based on a specific computer architecture and provide the functionality of an underlying physical computer system. Their implementations may involve specialized hardware, software, or a combination. A Virtual Machine Monitor (VMM) (also known as a hypervisor) is a software program that enables the creation, management, and governance of VMs and manages the operation of a virtualized environment on top of a physical host machine. A VMM is the primary software behind virtualization environments and implementations. When installed over a host machine, VMM facilitates the creation of VMs, each with separate operating systems (OS) and applications. VMM manages the backend operation of these VMs by allocating the necessary computing, memory, storage and other input/output (I/O) resources. VMM also provides a centralized interface for managing the entire operation, including status and availability of VMs that are installed over a single host machine or spread across different and interconnected hosts.

To achieve confidential and/or protected VM execution, the memory and the runtime processor state of the host machine must also be protected. For example, it is important to maintain the confidentiality (and integrity) of the memory assigned to a VM, and to prevent a malicious or exploited VMM from performing page remapping attacks for a memory address space via the use of extended page tables (EPT) to alter the final page mappings a VM uses. Additionally, a VM itself may perform page remapping attacks for the memory address space (inadvertently or intentionally). No solution exists to enhance the self-protection of VM memory space to date.

BRIEF DESCRIPTION OF THE DRAWINGS

The invention may best be understood by referring to the following description and accompanying drawings that are used to show embodiments of the invention. In the drawings.

DETAILED DESCRIPTION

Figure 1A:
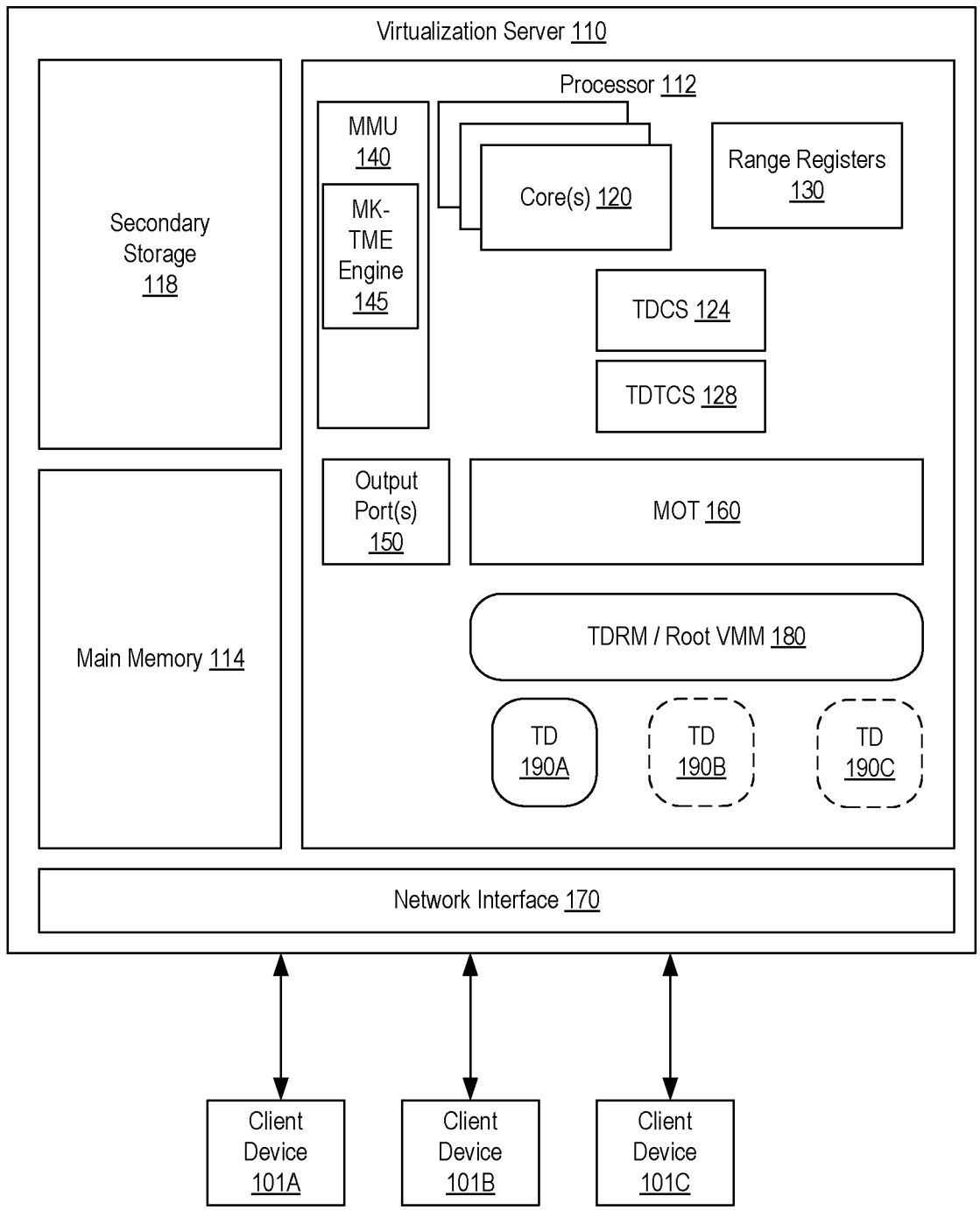
FIG. 1A is a block diagram illustrating an example computing system that provides isolation in virtualized systems using trust domains according to one implementation.

In the following description, numerous specific details are set forth. However, it is understood that embodiments of the invention may be practiced without these specific details. In other instances, well-known circuits, structures, and techniques have not been shown in detail in order not to obscure the understanding of this description.

Bracketed text and blocks with dashed borders (such as large dashes, small dashes, dot-dash, and dots) may be used to illustrate optional operations that add additional features to the embodiments of the invention. Such notation, however, should not be taken to mean that these are the only options or optional operations, and/or that blocks with solid borders are not optional in some embodiments of the invention.

References in the specification to "one embodiment," "an embodiment," "an example embodiment," etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following description and claims may use the terms "coupled" and "connected," along with their derivatives. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein, refers to any positive whole number of items including one item.

Trust Domain

As contemplated in the present disclosure, embodiments of the present invention include a processor security capability called Trust Domain Extensions (TDX) to meet increased security objectives via the use of memory encryption and integrity via memory controller engines. As used in TDX, a Trust Domain (TD) is a protected VM. Embodiments of the present invention deter page remapping attacks on the private memory address space of a TD. Note that Trust Domain may also be referred to as Trusted Domain, and the two terms are used interchangeably.

Embodiments comprise an additional extended page table (EPT) structure called a Secure Extended Page Table (SEPT) that is used by a processor for TD private page walks. The SEPT is a per-TD EPT (i.e., each TD has its own SEPT) that is managed by a Trust Domain Resource Manager (TDRM) only via special instructions added to the instruction set architecture (ISA) of the processor. The TDRM cannot alter SEPT without using these instructions otherwise an integrity failure will be reported by the processor. In other embodiments, all or parts of the SEPT may be access-controlled using processor range-register protection.

In typical VM implementations, the processor supports one EPT pointer (EPTP) per virtual memory control structure (VMCS). The VMCS is a data structure in memory that exists once per VM, while the VM is managed by the VMM. With every change of the execution context between different VMs, the VMCS is restored for the current VM, thereby defining the state of the VM's virtual processor. The VMM manages the EPT referenced by the EPTP. In embodiments of the present invention, the VMs may be encapsulated by TDs, and the VMCS may be replaced by an analogous control structure called the Trust Domain Control Structure (TDCS) that manages the guest state of TDs.

Page Miss Handler (PMH): The processor supports a new root pointer called a Trust Domain (TD) Secure Extended Page Table Pointer (SEPTP) (pointing to the SEPT currently being accessed) and for TD private page accesses, the page miss handler performs a nested page walk through the TD OS-managed guest page table (PT) and the SEPT. For non-private (i.e., shared) memory accesses, the processor performs an ordinary page walk using the untrusted EPT.

Instruction Set Architecture (ISA) to manage SEPT: The processor supports a set of instructions to safely allow the TDRM to manipulate the SEPT without violation of the security objectives—namely that the guest physical address (GPA) to host physical address (HPA) mapping (and GPA attributes) cannot be modified once a page of memory is assigned to a TD. This ISA entails SEPT management using instructions to add a page to a TD, to make a late addition of a page to a TD, to provide memory swapping support for pages assigned to a TD, and to remove a page from a TD. In addition, the processor provides the ISA to explicitly manage SEPT pages.

Addressing EPT remap attacks is one of the core requirements of removing the hypervisor from the Trusted Computing Base (TCB) for TDX to meet cloud service provider requirements. At the same time, the memory management flexibility of the TDRM must be retained for a scalable memory management scheme (e.g., supporting fragmented memory allocation, on-demand assignment, page swapping, etc.). Embodiments of the present invention meet those non-security requirements as well.

An architecture to provide isolation in virtualized systems using trust domains (TDs) is described. A current trend in computing is the placement of data and enterprise workloads in the cloud by utilizing hosting services provided by cloud service providers (CSPs). As a result of the hosting of the data and enterprise workloads in the cloud, customers (referred to as tenants herein) of the CSPs are requesting better security and isolation solutions for their workloads. In particular, customers are seeking out solutions that enable the operation of CSP-provided software outside of a TCB of the tenant's software. The TCB of a system refers to a set of hardware, firmware, and/or software components that have an ability to influence the trust for the overall operation of the system.

In implementations of the disclosure, a TD architecture and instruction set architecture (ISA) extensions (referred to herein as TD extensions (TDX)) for the TD architecture is implemented to provide confidentiality (and integrity) for customer (tenant) software executing in an untrusted CSP infrastructure. The TD architecture, which can be a System-on-Chip (SoC) capability, provides isolation between TD workloads and CSP software, such as a virtual machine manager (VMM) of the CSP. Components of the TD architecture can include 1) memory encryption via a MK-Total Memory Encryption (MKTME) engine, 2) a resource management capability referred to herein as the trust domain resource manager (TDRM) (a TDRM may be a software extension of the Virtual Machine Monitor (VMM)), and 3) execution state and memory isolation capabilities in the processor provided via a CPU-managed Memory Ownership Table (MOT) and via CPU access-controlled TD control structures. The TD architecture provides an ability of the processor to deploy TDs that leverage the MK-TME engine, the MOT, and the access-controlled TD control structures for secure operation of TD workloads Instruction Set Architecture (ISA) to manage SEPT: The processor supports a set of instructions to safely allow the TDRM to manipulate the SEPT without violation of the security objectives—namely that the guest physical address (GPA) to host physical address (HPA) mapping (and GPA attributes) cannot be modified once a page of memory is assigned to a TD. This ISA entails SEPT management using instructions to add a page to a TD, to make a late addition of a page to a TD, to provide memory swapping support for pages assigned to a TD, and to remove a page from a TD. In addition, the processor provides the ISA to explicitly manage SEPT pages.

Addressing EPT remap attacks is one of the core requirements of removing the hypervisor from the Trusted Computing Base (TCB) for TDX to meet cloud service provider requirements. At the same time, the memory management flexibility of the TDRM must be retained for a scalable memory management scheme (e.g., supporting fragmented memory allocation, on-demand assignment, page swapping, etc.,). Embodiments of the present invention meet those non-security requirements as well.

An architecture to provide isolation in virtualized systems using trust domains (TDs) is described. A current trend in computing is the placement of data and enterprise workloads in the cloud by utilizing hosting services provided by cloud service providers (CSPs). As a result of the hosting of the data and enterprise workloads in the cloud, customers (referred to as tenants herein) of the CSPs are requesting better security and isolation solutions for their workloads. In particular, customers are seeking out solutions that enable the operation of CSP-provided software outside of a TCB of the tenant's software. The TCB of a system refers to a set of hardware, firmware, and/or software components that have an ability to influence the trust for the overall operation of the system.

In implementations of the disclosure, a TD architecture and instruction set architecture (ISA) extensions (referred to herein as TD extensions (TDX)) for the TD architecture is provided to provide confidentiality (and integrity) for customer (tenant) software executing in an untrusted CSP infrastructure. The TD architecture, which can be a System-on-Chip (SoC) capability, provides isolation between TD workloads and CSP software, such as a virtual machine manager (VMM) of the CSP. Components of the TD architecture can include 1) memory encryption via a MK-Total Memory Encryption (MKTME) engine, 2) a resource management capability referred to herein as the trust domain resource manager (TDRM) (a TDRM may be a software extension of the Virtual Machine Monitor (VMM)), and 3) execution state and memory isolation capabilities in the processor provided via a CPU-managed Memory Ownership Table (MOT) and via CPU access-controlled TD control structures. The TD architecture provides an ability of the processor to deploy TDs that leverage the MK-TME engine, the MOT, and the access-controlled TD control structures for secure operation of TD workloads.

In one implementation, the tenant's software is executed in an architectural concept known as a TD. A TD (also referred to as a tenant TD) refers to a tenant workload (which can comprise of an operating system (OS) alone along with other ring-3 applications running on top of the OS, or a virtual machine (VM) running on top of a VMM along with other ring-3 applications, for example). Each TD operates independently of other TDs in the system and uses logical processor(s), memory, and I/O assigned by the TDRM on the platform. Each TD is cryptographically isolated in memory using at least one exclusive encryption key of the MK-TME engine for encrypting the memory (holding code and/or data) associated with the trust domain.

In implementations of the disclosure, the TDRM in the TD architecture acts as a host for the TDs and has full control of the cores and other platform hardware. A TDRM assigns software in a TD with logical processor(s). The TDRM, however, cannot access a TD's execution state on the assigned logical processor(s). Similarly, a TDRM assigns physical memory and I/O resources to the TDs, but the TDRM is not privy to access the memory state of a TD due to the use of separate encryption keys enforced by the processors per TD, and other integrity and replay controls on memory. Software executing in a TD operates with reduced privileges so that the TDRM can retain control of platform resources. However, the TDRM cannot affect the confidentiality or integrity of the TD state in memory or in the CPU structures under defined circumstances.

Conventional systems for providing isolation in virtualized systems do not extract the CSP software out of the tenant's TCB completely. Furthermore, conventional systems may increase the TCB significantly using separate chipset subsystems that implementations of the disclosure avoid. The TD architecture of implementations of the disclosure provides isolation between customer (tenant) workloads and CSP software by explicitly reducing the TCB by removing the CSP software from the TCB. Implementations provide a technical improvement over conventional systems by providing secure isolation for CSP customer workloads (tenant TDs) and allow for the removal of CSP software from a customer's TCB while meeting security and functionality requirements of the CSP. In addition, the TD architecture is scalable to multiple TDs, which can support multiple tenant workloads. Furthermore, the TD architecture described herein is generic and can be applied to any dynamic random-access memory (DRAM), or storage class memory (SCM)-based memory, such as Non-Volatile Dual In-line Memory Module (NV-DIMM). As such, implementations of the disclosure allow software to take advantage of performance benefits, such as NVDIMM direct access storage (DAS) mode for SCM, without compromising platform security requirements.

FIG. 1A is a schematic block diagram of a computing system 100 that provides isolation in virtualized systems using TDs, according to an implementation of the disclosure. The virtualization system 100 includes a virtualization server 110 that supports a number of client devices 101A-101C. The virtualization server 110 includes at least one processor 112 (also referred to as a processing device) that executes a TDRM 180. The TDRM 180 may include a VMM (may also be referred to as hypervisor) that may instantiate one or more TDs 190A-190C accessible by the client devices 101A-101C via a network interface 170. The client devices 101A-101C may include, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance, or any other type of computing device.

A TD may refer to a tenant (e.g., customer) workload. The tenant workload can include an OS alone along with other ring-3 applications running on top of the OS, or can include a VM running on top of a VMM along with other ring-3 applications, for example. In implementations of the disclosure, each TD may be cryptographically isolated in memory using a separate exclusive key for encrypting the memory (holding code and data) associated with the TD.

Figure 1B:
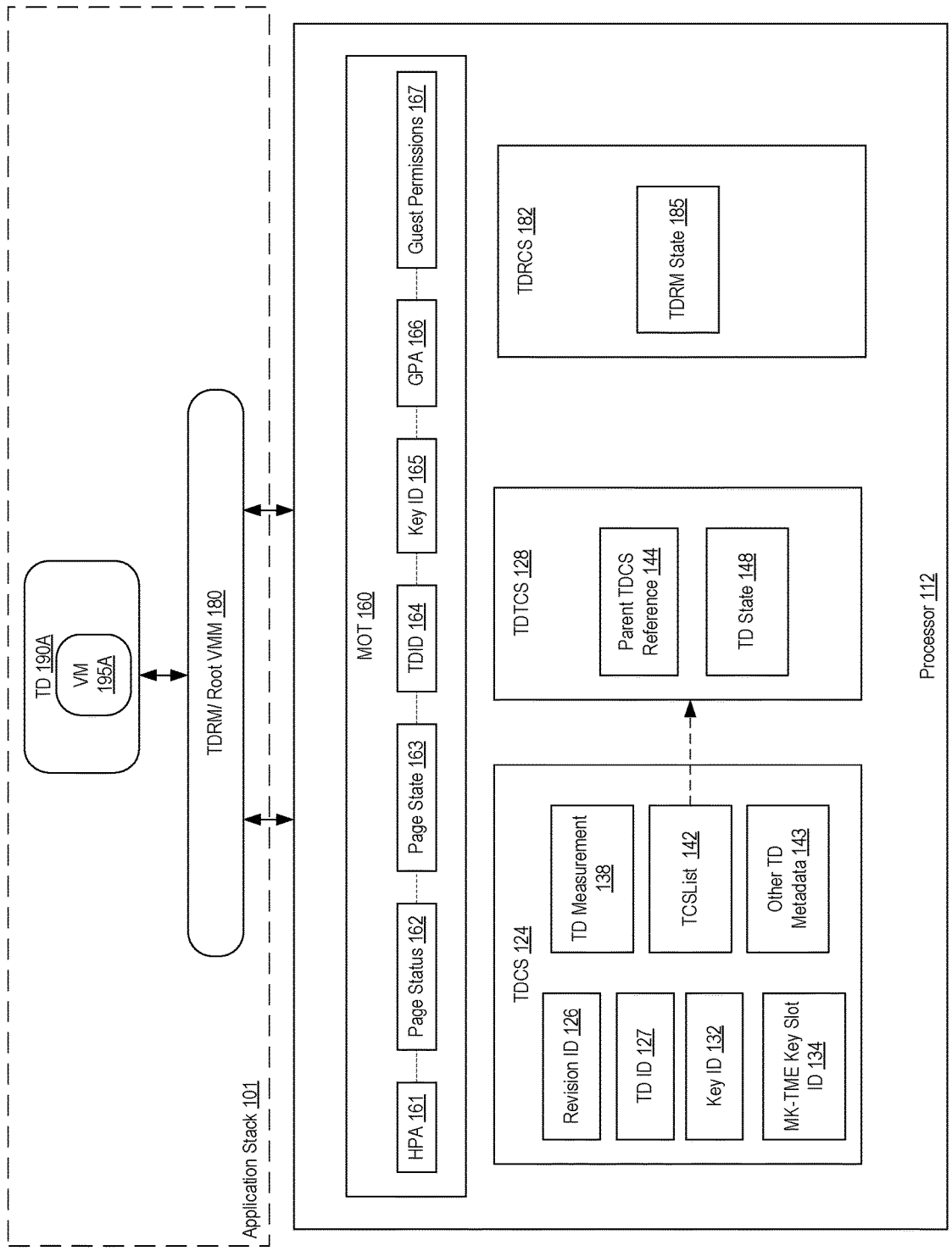
FIG. 1B is a block diagram illustrating another example computing system that provides isolation in virtualized systems using trust domains according to one implementation.

Processor 112 may include one or more cores 120 (also referred to as processing cores 120), range registers 130, a memory management unit (MMU) 140, and output port(s) 150. FIG. 1B is a schematic block diagram of a detailed view of executing (e.g., by a processor core 120) a TDRM 180 in communication with a MOT 160 and one or more trust domain control structure(s) (TDCS(s)) 124 and trust domain thread control structure(s) (TDTCS(s)) 128, as shown in FIG. 1A. TDTCS and TD-TCS may be used interchangeably herein. Processor 112 may be used in a system that includes, but is not limited to, a desktop computer, a tablet computer, a laptop computer, a netbook, a notebook computer, a PDA, a server, a workstation, a cellular telephone, a mobile computing device, a smart phone, an Internet appliance, or any other type of computing device. In another implementation, processor 112 may be used in a SoC system.

The computing system 100 is representative of processing systems based on micro-processing devices available from Intel Corporation of Santa Clara, California, although other systems (including PCs having other micro-processing devices, engineering workstations, set-top boxes, and the like) may also be used. In one implementation, sample system 100 executes a version of the WINDOWS™ operating system available from Microsoft Corporation of Redmond, Washington, although other operating systems (UNIX and Linux, for example), embedded software, and/or graphical user interfaces may also be used. Thus, implementations of the disclosure are not limited to any specific combination of hardware circuitry and software.

The one or more processing cores 120 execute instructions of the system. The processing core 120 includes, but is not limited to, pre-fetch logic to fetch instructions, decode logic to decode the instructions, execution logic to execute instructions, and the like. In an implementation, the computing system 100 includes a component, such as the processor 112 to employ execution units including logic to perform algorithms for processing data.

The virtualization server 110 includes a main memory 114 and a secondary storage 118 to store program binaries and OS driver events. Data in the secondary storage 118 may be stored in blocks referred to as pages, and each page may correspond to a set of physical memory addresses. The virtualization server 110 may employ virtual memory management in which applications run by the core(s) 120, such as the TDs 190A-190C, use virtual memory addresses that are mapped to guest physical memory addresses, and guest physical memory addresses are mapped to host/system physical addresses by MMU 140.

The core 120 may execute the MMU 140 to load pages from the secondary storage 118 into the main memory 114 (which includes a volatile memory and/or a nonvolatile memory) for faster access by software running on the processor 112 (e.g., on the core). When one of the TDs 190A-190C attempts to access a virtual memory address that corresponds to a physical memory address of a page loaded into the main memory 114, the MMU 140 returns the requested data. The core 120 may execute the VMM portion of TDRM 180 to translate guest physical addresses to host physical addresses of main memory and provide parameters for a protocol that allows the core 120 to read, walk, and interpret these mappings.

In one implementation, processor 112 implements a TD architecture and ISA extensions (TDX) for the TD architecture. The TD architecture provides isolation between TD workloads 190A-190C and from CSP software (e.g., TDRM 180 and/or a CSP VMM (e.g., root VMM 180)) executing on the processor 112. Components of the TD architecture can include 1) memory encryption via MK-TME engine 145, 2) a resource management capability referred to herein as the TDRM 180, and 3) execution state and memory isolation capabilities in the processor 112 provided via a MOT 160 and via access-controlled TD control structures (i.e., TDCS 124 and TDTCS 128). The TDX architecture provides an ability of the processor 112 to deploy TDs 190A-190C that leverage the MK-TME engine 145, the MOT 160, and the access-controlled TD control structures (i.e., TDCS 124 and TDTCS 128) for secure operation of TD workloads 190A-190C.

In implementations of the disclosure, the TDRM 180 acts as a host and has full control of the cores 120 and other platform hardware. A TDRM 180 assigns software in a TD 190A-190C with logical processor(s). The TDRM 180, however, cannot access a TD's 190A-190C execution state on the assigned logical processor(s). Similarly, a TDRM 180 assigns physical memory and I/O resources to the TDs 190A-190C, but TDRM 180 is not privy to access the memory state of a TD 190A due to separate encryption keys, and other integrity and replay controls on memory.

With respect to the separate encryption keys, the processor may utilize the MK-TME engine 145 to encrypt (and decrypt) memory used during execution. With total memory encryption (TME), any memory accesses by software executing on the core 120 can be encrypted in memory with an encryption key. MK-TME is an enhancement to TME that allows use of multiple encryption keys (the number of supported keys is implementation dependent). The processor 112 may utilize the MK-TME engine 145 to cause different pages to be encrypted using different MK-TME keys. The MK-TME engine 145 may be utilized in the TD architecture described herein to support one or more encryption keys per each TD 190A-190C to help achieve the cryptographic isolation between different CSP customer workloads. For example, when MK-TME engine 145 is used in the TD architecture, the CPU enforces by default that TD (all pages) are to be encrypted using a TD-specific key. Furthermore, a TD may further choose specific TD pages to be plain text or encrypted using different ephemeral keys that are opaque to CSP software.

Each TD 190A-190C is a software environment that supports a software stack consisting of VMMs (e.g., using virtual machine extensions (VMX)), OSes, and/or application software (hosted by the OS). Each TD 190A-190C operates independently of other TDs 190A-190C and uses logical processor(s), memory, and I/O assigned by the TDRM 180 on the platform. Software executing in a TD 190A-190C operates with reduced privileges so that the TDRM 180 can retain control of platform resources; however, the TDRM cannot affect the confidentiality or integrity of the TD 190A-190C under defined circumstances. Further details of the TD architecture and TDX are described in more detail below with reference to FIG. 1B.

Implementations of the disclosure are not limited to computer systems. Alternative implementations of the disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processing device (DSP), system on a chip, network computers (NetPC), set-top boxes, network hubs, wide area network (WAN) switches, or any other system that can perform one or more instructions in accordance with at least one implementation.

One implementation may be described in the context of a single processing device desktop or server system, but alternative implementations may be included in a multiprocessing device system. Computing system 100 may be an example of a 'hub' system architecture. The computing system 100 includes a processor 112 to process data signals. The processor 112, as one illustrative example, includes a complex instruction set computer (CISC) micro-processing device, a reduced instruction set computing (RISC) micro-processing device, a very long instruction word (VLIW) micro-processing device, a processing device implementing a combination of instruction sets, or any other processing device, such as a digital signal processing device, for example. The processor 112 is coupled to a processing device bus that transmits data signals between the processor 112 and other components in the computing system 100, such as main memory 114 and/or secondary storage 118, storing instruction, data, or any combination thereof. The other components of the computing system 100 may include a graphics accelerator, a memory controller hub, an I/O controller hub, a wireless transceiver, a Flash BIOS, a network controller, an audio controller, a serial expansion port, an I/O controller, etc. These elements perform their conventional functions that are well known to those familiar with the art.

In one implementation, processor 112 includes a Level 1 (L1) internal cache memory. Depending on the architecture, the processor 112 may have a single internal cache or multiple levels of internal caches. Other implementations include a combination of both internal and external caches depending on the particular implementation and needs. A register file is to store different types of data in various registers including integer registers, floating point registers, vector registers, banked registers, shadow registers, checkpoint registers, status registers, configuration registers, and instruction pointer register.

It should be noted that the execution unit may or may not have a floating-point unit. The processor 112, in one implementation, includes a microcode (ucode) ROM to store microcode, which when executed, is to perform algorithms for certain macroinstructions or handle complex scenarios. Here, microcode is potentially updateable to handle logic bugs/fixes for processor 112.

Alternate implementations of an execution unit may also be used in micro controllers, embedded processing devices, graphics devices, DSPs, and other types of logic circuits. System 100 includes a main memory 114 (may also be referred to as memory 114). Main memory 114 includes a DRAM device, a static random-access memory (SRAM) device, flash memory device, or other memory device. Main memory 114 stores instructions and/or data represented by data signals that are to be executed by the processor 112. The processor 112 is coupled to the main memory 114 via a processing device bus. A system logic chip, such as a memory controller hub (MCH) may be coupled to the processing device bus and main memory 114. An MCH can provide a high bandwidth memory path to main memory 114 for instruction and data storage and for storage of graphics commands, data and textures. The MCH can be used to direct data signals between the processor 112, main memory 114, and other components in the system 100 and to bridge the data signals between processing device bus, memory 114, and system I/O, for example. The MCH may be coupled to memory 114 through a memory interface. In some implementations, the system logic chip can provide a graphics port for coupling to a graphics controller through an Accelerated Graphics Port (AGP) interconnect.

The computing system 100 may also include an I/O controller hub (ICH). The ICH can provide direct connections to some I/O devices via a local I/O bus. The local I/O bus is a high-speed I/O bus for connecting peripherals to the memory 114, chipset, and processor 112. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

For another implementation of a system, the instructions executed by the processing device core 120 described above can be used with a system on a chip. One implementation of a system on a chip comprises of a processing device and a memory. The memory for one such system is a flash memory. The flash memory can be located on the same die as the processing device and other system components. Additionally, other logic blocks such as a memory controller or graphics controller can also be located on a system on a chip.

With reference to FIG. 1B, this figure depicts a block diagram of the processor 112 of FIG. 1A, according to one implementation of the disclosure. In one implementation, the processor 112 may execute an application stack 101 via a single core 120 or across several cores 120. As discussed above, the processor 112 may provide a TD architecture and TDX to provide confidentiality (and integrity) for customer software running in the customer/tenants (i.e., TDs 190A) in an untrusted cloud service providers (CSP) infrastructure. The TD architecture provides for memory isolation via a MOT 160; CPU state isolation that incorporates CPU key management via TDCS 124 and/or TDTCS 128; and CPU measurement infrastructure for TD 190A software.

In one implementation, TD architecture provides ISA extensions (referred to as TDX) that support confidential operation of OS and OS-managed applications (virtualized and non-virtualized). A platform, such as one including processor 112, with TDX enabled can function as multiple encrypted contexts referred to as TDs. For ease of explanation, a single TD 190A is depicted in FIG. 1B. Each TD 190A can run VMMs, VMs, OSes, and/or applications. For example, TD 190A is depicted as hosting VM 195A.

In one implementation, the TDRM 180 may include as part of VMM functionality (e.g., root VMM). A VMM may refer to software, firmware, or hardware to create, run, and manage a virtual machine (VM), such as VM 195A. It should be noted that the VMM may create, run, and manage one or more VMs. As depicted, the VMM 110 is included as a component of one or more processing cores 120 of a processing device 122. The VMM 110 may create and run the VM 195A and allocate one or more virtual processors (e.g., vCPUs) to the VM 195A. The VM 195A may be referred to as guest 195A herein. The VMM may allow the VM 195A to access hardware of the underlying computing system, such as computing system 100 of FIG. 1A. The VM 195A may execute a guest operating system (OS). The VMM may manage the execution of the guest OS. The guest OS may function to control access of virtual processors of the VM 195A to underlying hardware and software resources of the computing system 100. It should be noted that, when there are numerous VMs 195A operating on the processing device 112, the VMM may manage each of the guest OSes executing on the numerous guests. In some implementations, a VMM may be implemented with the TD 190A to manage the VMs 195A. This VMM may be referred to as a tenant VMM and/or a non-root VMM and is discussed in further detail below.

TDX also provides a programming interface for a TD management layer of the TD architecture referred to as the TDRM 180. A TDRM may be implemented as part of the CSP/root VMM. The TDRM 180 manages the operation of TDs 190A. While a TDRM 180 can assign and manage resources, such as CPU, memory, and input/output (I/O) to TDs 190A, the TDRM 180 is designed to operate outside of a TCB of the TDs 190A. The TCB of a system refers to a set of hardware, firmware, and/or software component that have an ability to influence the trust for the overall operation of the system.

In one implementation, the TD architecture is thus a capability to protect software running in a TD 190A. As discussed above, components of the TD architecture may include 1) Memory encryption via a TME engine having Multi-key extensions to TME (e.g., MK-TME engine 145 of FIG. 1A), 2) a software resource management layer (TDRM 180), and 3) execution state and memory isolation capabilities in the TD architecture.

Figure 2A:
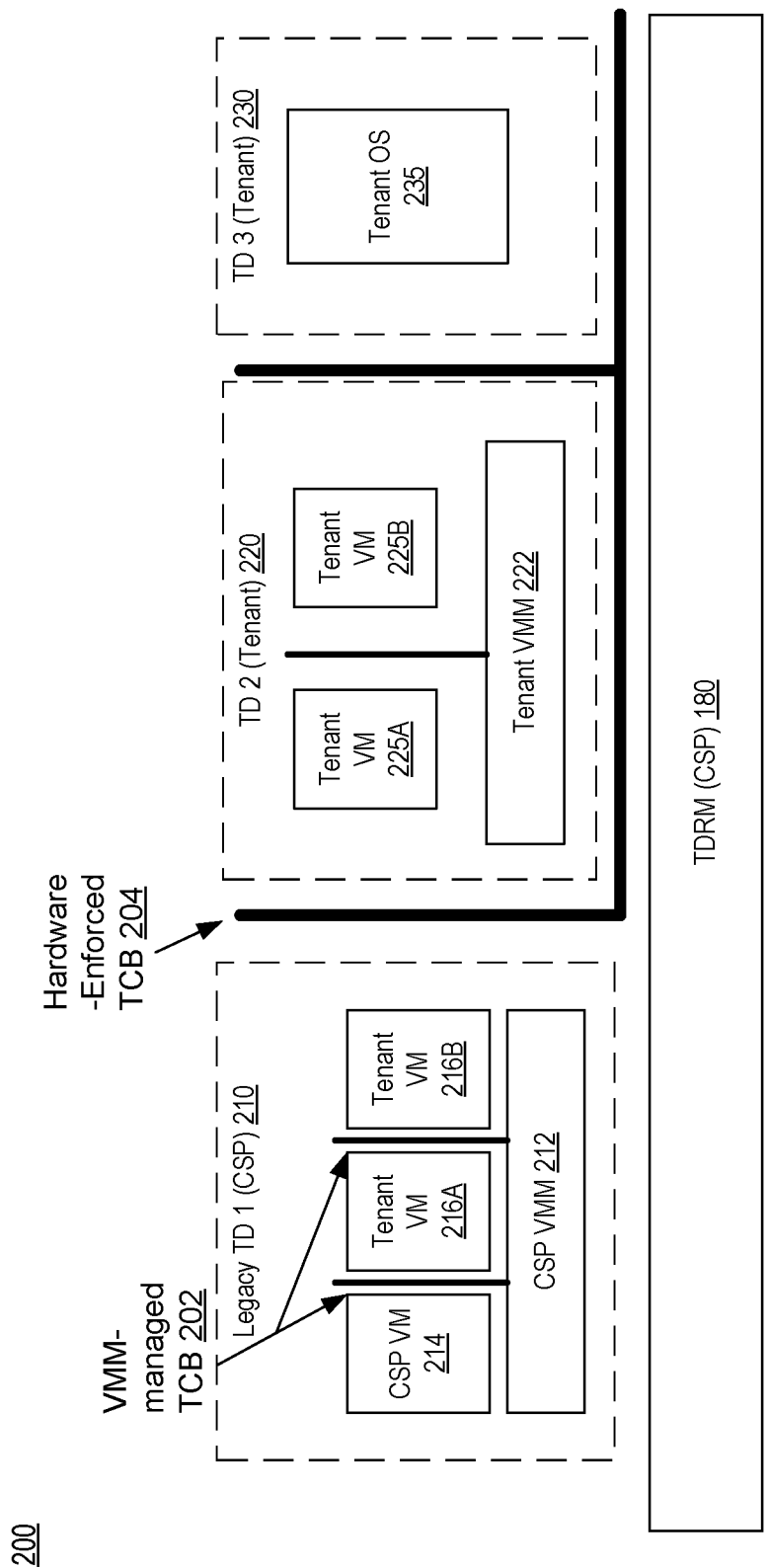
FIG. 2A is a block diagram of an example of a trust domain architecture according to one implementation.

FIG. 2A is a block diagram depicting an example computing system implementing TD architecture 200. The TD architecture 200 supports two types of TDs. A first type of TD is a TD where the tenant trusts the CSP to enforce confidentiality and does not implement the TD architecture of implementations of the disclosure. This type of legacy TD is depicted as TD 1 210. TD 1 210 is a CSP TD having a CSP VMM-managed TCB 202. TD 1 210 may include a CSP VMM 212 managing a CSP VM 214 and/or one or more tenant VMs 216A, 216B. In this case, the tenant VMs 216A, 216B are managed by the CSP VMM 212 that is in the VM's 216A, 216B TCB 202. In implementations of the disclosure, the tenant VMs 216A, 216B may still leverage memory encryption via TME or MK-TME in this model (described further below).

The other type of TD is a TD where the tenant does not trust the CSP to enforce confidentiality and thus relies on the CPU with TD architecture of implementations of the disclosure. This type of TD is shown in two variants as TD 2 220 and TD 3 230. The TD 2 220 is shown with a virtualization mode (such as VM extension (VMX)) being utilized by the tenant VMM (non-root) 222 running in TD 2 220 to managed tenant VMs 225A, 225B. The TD 3 230 does not include software using a virtualization mode, but instead runs an enlightened OS 235 in the TD 3 230 directly. TD 2 220 and TD 3 230 are tenant TDs having a hardware enforced TCB 204 as described in implementations of the disclosure. In one implementation, TD 2 220 or TD 3 230 may be the same as TD 190A described with respect to FIGS. 1A and/or 1B.

The TDRM 180 manages the life cycle of all three types of TDs 210, 220, 230, including allocation of resources. However, the TDRM 180 is not in the TCB for TD types TD 2 220 and TD 3 230. The TD architecture 200 does not place any architectural restrictions on the number or mix of TDs active on a system. However, software and certain hardware limitations in a specific implementation may limit the number of TDs running concurrently on a system due to other constraints.

Figure 2B:
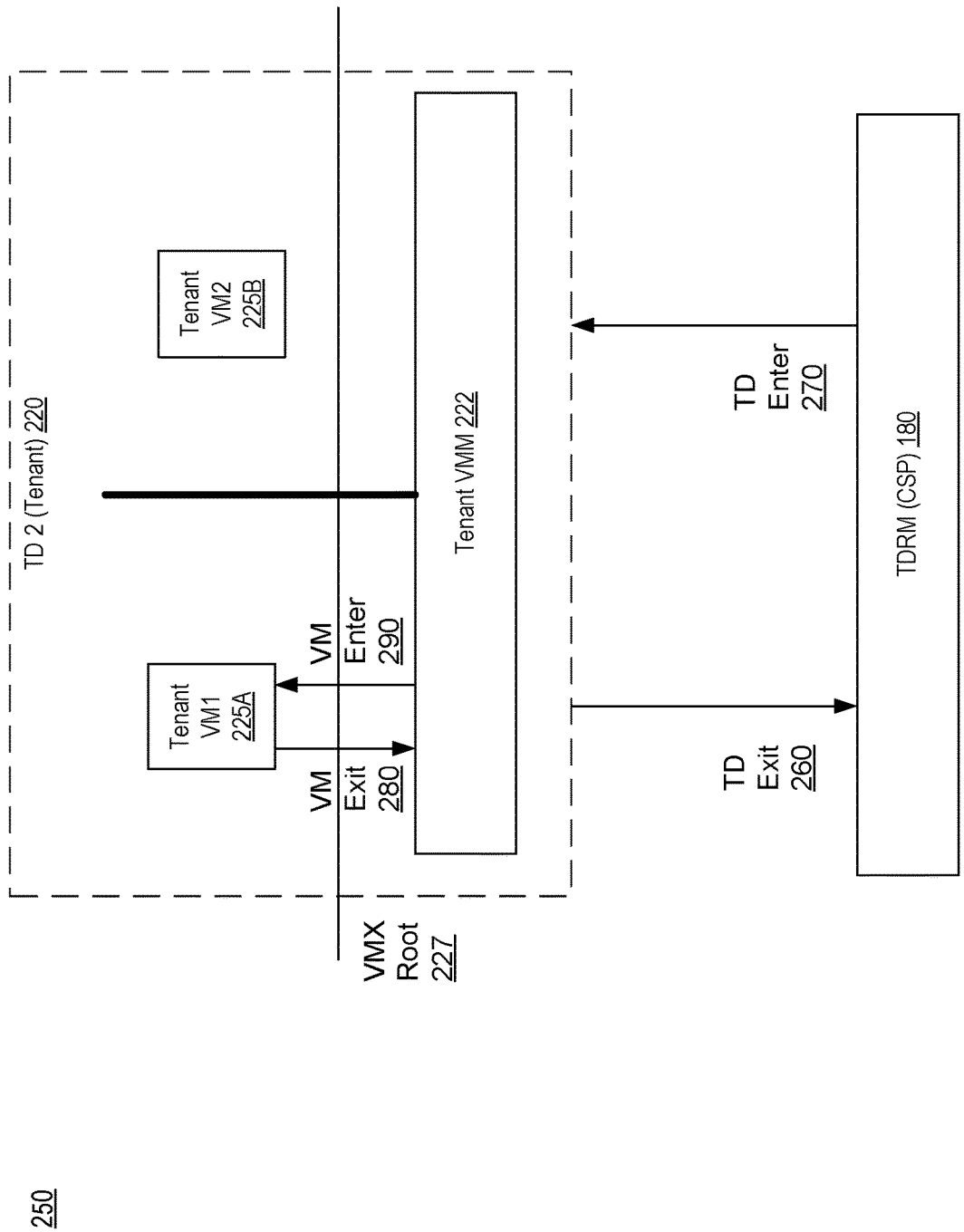
FIG. 2B is a block diagram of another example of a trust domain architecture according to one implementation.

FIG. 2B is a block diagram depicting an example of a TD architecture 250 and the interactions between a TD 220 and TDRM 280. In one implementation, TD 220 and TDRM 280 are the same as their counterparts described with respect to FIG. 2A. The TD architecture 250 may be the same as a TD architecture provided by computing device 100 of FIGS. 1A and 1B, and/or TD architecture 200 of FIG. 2A. TD architecture 250 provides a layer that manages lifecycle of TDs active on a system. Processor support for TDs is provided by a form of processor operation called a TDX operation. There are two kinds of TDX operations: a Resource Manager operation and a Tenant operation. In general, the TDRM 180 runs in TDX Resource Manager operation and TDs, such as TD 2 220, run in TDX Tenant operation. Transitions between Resource-Manager operation and Tenant operation are called TDX transitions.

There are two kinds of TDX transitions: TD entry 270 and TD exit 260. Transitions from TDX Resource-Manager operation into TDX Tenant operation are called TD entries 270. Transitions from TDX Tenant operation to TDX Resource Manager operation are called TD exits 260.

Processor behavior in TDX Resource-Manager operation is similar as it is outside of TDX operation. The principal differences are that a set of TDX operations (TDX instructions) is available and that values that can be loaded into certain control registers are limited to restrict the modes and abilities of the TDRM 180.

Processor behavior in TDX Tenant operation is similarly restricted to facilitate isolation. For example, instead of ordinary operation, certain events cause TD exits 260 to the TDRM 180. These TD exits 260 do not allow the TDRM 180 to modify TD 220 behavior or state. The TDRM 180 uses platform capabilities to retain control of platform resources. Software running in a TD 220 may use software-visible information to determine it is running in a TD 220, and the software may enforce local measurement policies on additional software loaded into the TD 220. However, validating the security state of the TD 220 is performed by a remote attestation party to ensure confidentiality.

The TD architecture 250 is designed to minimize compatibility impact on software that relies on virtualization when running in a TD 220, and therefore, leaves most interactions between a VM 225A, 225B running in Tenant operation and a Tenant VMM 222 running in Tenant operation unchanged. If there is no VMM 222 present in a TD 220, a VM OS may be modified to work with TDRM 180 as the root VMM.

In one implementation, the TDRM 180 may explicitly decide to cause a TD exit 260, for example, to terminate a TD 120 or to manage memory resources (e.g., yield assigned memory resource, request free memory resources, etc.). The TD architecture 250 also provides the TDRM 180 with the ability to force TD exits 260 for preemption. On TD exits 260, the TD architecture enforces that the execution state of a TD 220 is saved in CPU access-controlled memory allocated to the TD 220 and encrypted using a unique encryption key (discussed further below) of the TD 220 that is not visible to TDRM 180 or other TDs to protect confidentiality of TD state from the TDRM 180 or other TDs. The TD execution state may similarly be protected against spoofing, remapping, and/or replay via integrity controls on memory.

TD enter 270 is a complementary event to TD exit 260. For example, a TD enter 270 may occur when the TDRM 180 schedules a TD 220 to run on a logical processor and transfers execution to the software running in the TD 220. During TD enter 270, the TD architecture 250 enforces that the execution state of the TDRM 180 is saved in memory owned by the TDRM, which is encrypted using a unique encryption key assigned for sole use by the TDRM 180.

TDs, such as TD 220, can be set up by the TDRM 180 using a TDCREATE (to create TDCS), a TDTCREATE (to create TDTCS) and a TDADDPAGE instruction that causes memory belonging to a TD 220 to be encrypted using the TD's unique encryption key that is not visible or accessible to the TDRM 180 or other TDs. Before executing any instructions belonging to a TD, all TD memory is encrypted using the TD's unique key. Although specific instruction names are referenced herein, other names for the instructions may be utilized in implementations of the disclosure and are not limited to the specific names provided herein.

In one implementation, the TDRM 180 can launch each TD 220 with a small software image (similar to IBB or Initial Boot Block) after signature verification and record the IBB measurements (for subsequent attestation) using a platform root of trust. It is the IBB software executing in the TD 220 that is responsible for completing the measured launch of the TD 220 and requesting additional resources from the TDRM 180. The TD 220 has the option to use a single encryption key for the entire TD 220 or use additional encryption keys for different Tenant VMs 225A, 225B (and/or containers or different memory resources such as NVRAM) when running inside the TD 220. Thus, when the TD 220 is first set up, the TD 220 is using an exclusive CPU-generated MK-TME key. Thereafter, the TD 220 may optionally set up additional MK-TME encryption keys for each tenant software-managed context that operates inside the TD 220 (e.g., tenant VMs 225A, 225B, containers, or other memory types).

In order to minimize software compatibility impact on VMMs both for CSP (e.g., TDRM root VMM 180 and tenant VMM 222), virtualization (e.g., VMX) operation may remain unmodified inside a TD 220 in TD architecture 250.

Similarly, operation of VMM software, such as extended page table (EPT) management, can remain under the control of the tenant VMM 222 (if one is active in the TD 220 and is not managed by the TDRM 180). As the TDRM 180 assigns physical memory for each TD 220, the TD architecture 250 includes the MOT (i.e., MOT 160 described with respect to FIGS. 1A and 1B). The processor 112 consults the TDRM 180-managed MOT to assign allocation of memory to TDs 220. This allows the TDRM 180 the full ability to manage memory as a resource without having any visibility into data resident in assigned TD memory. In some implementations, as discussed above, the platform (e.g., root) VMM and TDRM 180 may be in the same encryption key domain, thus sharing the memory management and scheduler functions (but still remaining outside the Tenant's TCB).

The MOT 160 (which may be referred to as TD-MOT) is a structure, such as a table, managed by the processor 112 to enforce assignment of physical memory pages to executing TDs, such as TD 190A. The processor 112 also uses the MOT 160 to enforce that the physical addresses referenced by software operating as a tenant TD 190A or the TDRM 180 cannot access memory not explicitly assigned to it.

The MOT 160 enforces the following properties. First, software outside a TD 190A should not be able to access (read/write/execute) in plain-text any memory belonging to a different TD (this includes TDRM 180). Second, memory pages assigned via the MOT 160 to specific TDs, such as TD 190A, should be accessible from any processor in the system (where the processor is executing the TD that the memory is assigned to).

The MOT 160 structure is used to hold meta-data attributes for each 4 KB page of memory. Additional structures may be defined for additional page sizes (2 MB, 1 GB). The meta-data for each 4 KB page of memory is directly indexed by the physical page address. In other implementations, other page sizes may be supported by a hierarchical structure (like a page table).

A 4 KB page referenced in the MOT 160 can belong to one running instance of a TD 190A. 4 KB pages referenced in the MOT 160 can either be valid memory or marked as invalid (hence could be I/O for example). In one implementation, each TD instance 190A includes one page holding a TDCS 124 for that TD 190A.

In one implementation, the MOT 160 is aligned on a 4 KB boundary of memory and occupies a physically contiguous region of memory protected from access by software after platform initialization. In an implementation, the MOT is a micro-architectural structure and cannot be directly accessed by software. Architecturally, the MOT 160 holds the following security attributes for each 4 KB page of host physical memory:

- Page Status 162—Valid/Invalid bit (whether the page is valid memory or not)
- Page Category—DRAM, NVRAM, I/O, Reserved
- Page State 163—(4-bit vector) specifies if the page is:
  - bit 1—Free (a page that is not assigned to a TD and not used by the TDRM)
  - bit 2—Assigned (a page assigned to a TD or TDRM)
  - bit 3—Blocked (a page blocked as it is in the process of freeing/(re)assigning)
  - bit 4—Pending (a dynamic page assigned to the TD but not yet accepted by TD)
- TDID 164—(40 bit) TD Identifier that assigns the page to a specific unique TD. Address of the TDCS.

In some implementations, an extended MOT 160 entry may be supported which further includes:

- Page Key ID 165—(8 bits—size is implementation specific) Specifies the per page encryption key expected to be matched to the Key ID fetched during the processor page walk for physical memory referenced by a TD. If the MOT 160 entry is not an extended entry, the Page Key ID is derived from the TDCS 124. One of the key Id values specified in the MOT may be used to share memory contents with the TDRM (or the root VMM). The shared pages may hold Input-output buffers to be sent to a hardware device managed by the TDRM. Similarly shared pages may be used for emulation of virtual devices exposed to the TD by the TDRM.
- Guest Physical Address 166—(52 bits) Specifies the expected Guest Physical Address used by software executing in a TD. (This field is used when the TDRM 180 expects to perform memory remapping and implements the ability to swap memory).
- Guest Permissions 167—to assert on the final page (Read, Write, Execute for user and supervisor). There may be multiple sets of these permissions bits to support VMMs executing in a TD.

The MOT 160 may be enabled when TDX is enabled in the processor 112 (e.g., via CR4 enable bit, after CPUID-based enumeration). Once the MOT 160 is enabled, the MOT 160 can be used by the processor 112 to enforce memory access control for all physical memory accesses initiated by software, including the TDRM 180. In one implementation, the access control is enforced during the page walk for memory accesses made by software. Physical memory accesses performed by the processor 112 to memory that is not assigned to a tenant TD 190A or TDRM 180 fail with Abort page semantics.

In implementations of the disclosure, the TDRM 180 manages memory resources via the MOT 160 using a MOT operation instruction (TDMOTOP) with the following instruction leaves:

Add page to MOT (TDMOTADDPAGE)—Marks a free MOT 160 entry corresponding to a host physical address (HPA) as assigned (exclusively) to a TD 190A specified by a TDID. Any other prior page state causes a fault. This instruction forces a cross-thread TLB shootdown to confirm that no other TD 190A is caching a mapping to this HPA. This instruction leaf can be invoked by the TDRM 180. If the TDRM 180 has enabled an extended MOT, then the instruction can specify the initial guest physical address (GPA) that is mapped to the specified HPA. The processor 112 verifies that the GPA is mapped to the HPA by walking the EPT structure managed by the TDRM 180. A variant of the Add page may be implemented, which assigns a page to a TD (TDMOTAUGPAGE) but does not capture a measurement of the page.

Revoke page from MOT (TDMOTREVOKEPAGE)—Marks an assigned page as a free page. This instruction forces a cross-thread TLB shootdown to confirm that subsequent TD 190A accesses check for HPA ownership, and that the page contents are cleared by the processor 112. A TD 190A access that experiences a MOT 160 page fault during TLB fill causes the processor 112 to invalidate the TDCS 124, which prevents further TD enter into the TD 190A. This instruction leaf may be invoked by the TDRM 180.

Block page in MOT (TDMOTBLOCKPAGE)—Marks a free or assigned MOT 160 entry corresponding to an HPA as blocked for software usage. Any other prior page state causes a TDRM 180 fault. This instruction forces a cross-thread TLB shootdown to confirm that subsequent TD 190A accesses check for HPA ownership. This instruction leaf may be invoked by the TDRM 180.

Unblock page in MOT (TDMOTUNBLOCKPAGE)—Marks a blocked MOT 160 entry corresponding to an HPA as valid for software usage/assignment. Any other prior page state causes a fault. This instruction leaf can be invoked by the TDRM 180.

Memory assigned to a TD 190A may be returned to the TDRM 180 via an explicit TDCALL after the TD software has cleared any secrets in memory. Extended operation of the MOT 160 is used for cases where: (1) a VMM in the TD 190A may have remapped GPAs in use inside the TD, and/or (2) the TDRM 180 may want to swap memory assigned to the TD 190A. In both cases above, a TDRM 180 EPT violation would be generated with the mismatched GPA used during the page walk. The following extended MOT instruction leaves address the cases above:

Modify PGA in MOT (TDMOTMODPMA)—To handle the first case above, the TDRM 180 utilize this extended MOT 160 instruction to update the MOT 160 security attributes for the page used by the TD 190A. The TDRM 180 provides a GPA which is used by the CPU to walk the TD VMM-managed EPT structure and retrieves the new GPA referenced by the TD VMM. The processor 112 then performs a walk of the TDRM 180 EPT to find the referenced HPA, and if the page is assigned to the active TD 190A, the expected GPA attribute is updated to match the mismatched GPA reported during the walk that faulted. The TDRM 180 can then resume the TD 190A.

For the second case above, the TDRM 180 has already unmapped the GPA from its EPT structure, and on the fault, should use the block page in MOT instruction (TDMODBLOCKPAGE) to mark the page as software unusable (with flush), and should use the extended MOT 160 instructions: TDEXTRACT and TDINJECT to create a cryptographically protected swappable version of the page contents which can be restored for a newly assigned HPA. The TDEXTRACT (and TDINJECT) instructions capture (and verify resp.) cryptographically signed integrity information for the swapped TD pages so they can be verified when being restored. The cryptographic information may include counters to ensure that a malicious TDRM cannot replay stale pages.

In one implementation, initialization of the TDRM 180 begins with enabling TDX in the processor 112 by setting, for example, the CR4.TDXE bit or via a VMX MSR control bit during VMXON. TDX support can be enumerated via a CPUID. Once TDX is enabled, the TDRM 180 performs (i.e., executes) an enable TDX mode instruction (TDXON) to enable a TDX mode of the processor; alternately, the mode may be enabled as part of VMXON. TDXON registers a naturally-aligned 4-KB region of memory that a logical processor uses for a TDRM 180 state area. In one implementation, the TDRM 180 state area is stored in a TDRM control structure (TDRCS) 182 as TDRM state 185; the TDRCS (also referred to as TD-RCS, and the two terms are used interchangeably) may also be implemented as a new type of VMCS which only contains host state, controls, and TD exit info. In one implementation, the TDCS and TDTCS are access-controlled via the MOT 160 (e.g., an encryption key ID stored in the MOT 160 is used to enforce memory access controls). In another implementation, the TDCS and TDTCS are access-controlled via storage in a restricted range register(s), such as range registers 130, of the processor 112 that is inaccessible to software accesses. TDRM state 185 is described in further detail below. The physical address of the 4 KB page used for the TDRCS 182 is provided in an operand to TDXON. The TDRM 180 makes this page inaccessible to all TDs 190A via the MOT 160. The TDRM 180 should initialize and access the TDRCS 185. The TDRM 180 should use a separate TDRCS 185 for each logical processor.

In one implementation, an example TDRM state 185 initialized by the TDRM 180 and loaded by the processor 112 on TD exit may include, but is not limited to, the following state depicted in Table 1 below:

TABLE 1

| Processor State (64 bit) loaded from TDRCS on TD Exit | |
|---|---|
| Field | Description |
| RIP | Linear address in TDRM address space where execution starts in TD root mode on a TD Exit |
| RSP | TDRM stack pointer (linear address) |
| ES Selector | Segment info |
| CS Selector | Segment info |
| SS Selector | Segment info |
| DS Selector | Segment info |
| FS Selector | Segment info |
| GS Selector | Segment info |
| TR Selector | Segment info |
| FS Base | Segment base |
| GS Base | Segment base |
| TR Base | Segment base |
| GDTR Base | Segment base |
| IDTR Base | Segment base |
| CR0 | Force PG/NE/PE = 1, ignore CD/NW |
| CR3 | Allow TDRM to specify |
| CR4 | Force VMXE/PAE = 1 |
| IA32_PAT | Allow TDRM to specify |

The following processor state is set/fixed automatically during TD Exit (hence is not specified in the TDRCS):
 CR0, CR4 for 64-bit mode (May need an additional CR4 mask value)
 DR7, scrub DRs: cleared: need to consider PDR bit implications
 IA32_DEBUGCTL, IA32_PERF_GLOBAL_CTRL, IA32_PAT, IA32_BNDCFGS
 IA32_EFER (ensure 64-bit mode)
 Segment registers (base limit access): same as VM exit
 RFLAGS: same as VM exit—set to 0x2
 LDTR: same as VM exit—null
The following processor state is cleared automatically during TD Exit (hence is not specified in the TDRCS):
 IA32_SYSENTER_CS/EIP/ESP
 IA32_KERNEL_GS_BASE
 IA32_STAR/FMASK/LSTAR
 GPRs (except RSP)
 XSAVE state
 Extended state (x87/SSE, CET etc.)—May treat as optional and other conditional state The TDRCS also holds the control fields and the exit info structure (for reporting TD exit information), as provided below in Table 2:

TABLE 2

| TDRCS Structure | |
|---|---|
| Field | Description |
| MSR access-control bitmap address | 64-bit physical address of 4 KB page holding the MSR access-control bitmaps |
| XSAVES access-control bitmap | 64-bit XSAVES access-control bitmap |
| Extended Page Table Pointer | 64-bit EPTP |

TABLE 2-continued

TDRCS Structure

| Field | Description |
| --- | --- |
| TD Pre-emption Timer | 64-bit TD Pre-emption timer |
| TDTCS Slot Id | Link this TDRCS to a specific TDTCS for duration of TD entry |

Table 3 depicted below details Exit information fields in the TDRCS:

TABLE 3

TDRCS Exit information fields

| Field | Description |
| --- | --- |
| TDEXIT_REASON | 64 bit value (n bits valid, 64-n bits reserved). See Table below for values. |
| TDEXIT_QUAL | See Table below. |

In one implementation, a TD 190A may be created and launched by the TDRM 180. The TDRM 180 creates a TD 190A using a TD create instruction (TDCREATE and TDT-CREATE). The TDRM 180 selects a 4 KB aligned region of physical memory and provides this as a parameter to the TD create instruction. This region of memory is used as a TDCS 124 for the TD 190A. When executed, the TDCREATE instruction causes the processor 112 to verify that the destination 4 KB page is assigned to the TD (using the MOT 160). The TDCREATE instruction further causes the processor 112 to generate an ephemeral memory encryption key and key ID for the TD 190A, and to store the key ID in the TDCS 124. The processor 112 then initializes the page contents on the destination page using the encryption key assigned to the TD. In one implementation, initializing the page contents includes initiating the TD state of the TD, which is described further below with respect to the TDTCS 128. The TDCREATE instruction then causes the processor 112 to initialize a hash for a TD measurement in the TDCS 124.

In one implementation, the TDRM 180 sets up the IBB code/data for the TD 190A using a TDADDPAGE instruction (discussed above) that specifies the address of the TDCS 124 page (of the TD 190A) as a parameter, an address of a code/data page for the TD image in TDRM address space, and the physical page assigned to the TD 190A. The processor 112 then verifies that the destination 4 KB page is assigned to the TD 190A. Once verified, the processor 112 extends the hash for the TD 190A in the TDCS 124. Then, the processor copies the page contents from source to destination page using the unique encryption key assigned to the TD 190A.

The TDRM 180 provides TD boot configuration via a data page containing physical memory map (and an identity page table). The TDRM 180 initializes physical memory and the processor 112 verifies that the pages are assigned to the TD 190A and identifies page table. The TDRM 180 then finalizes the measurement of the TD 190A using a TDINIT instruction. The TDRM 180 may then start execution of the TD 180 using a TDENTER instruction (this uses a TDTCS 128 as described further below).

Referring now to the TDCS 124, this control structure specifies controls that the processor 112 initializes when a TD 190A is created successfully. The TDCS 124 is available when the TD 190A is enabled. In one implementation, the TDCS occupies a 4K naturally aligned region of memory. A page identified as a TDCS 124 in the MOT 160 is blocked against software reads/writes after the TDCREATE instruction is successfully executed. In one implementation, the TDCS 124 is access-controlled via the MOT 160 (e.g., as described above, an assigned key ID for the TDCS 124 stored in the MOT 160 is used during page walks of the processor 112 to prevent unauthorized software read/write). In another implementation, the TDCS 124 is access-controlled via storage in a restricted range register(s) of the processor 112 that is inaccessible to software accesses. The TDCS 124 may include, but is not limited to, the following fields depicted below in Table 4:

TABLE 4

TDCS Structure

| Field | Size (bytes) | Description |
| --- | --- | --- |
| REVISION | 4 | Revision Identifier 126 |
| TDID | 8 (40 bits valid, rest reserved) | TD Identifier 190 A |
| COUNT_TCS | 4 (16 bits valid, rest reserved) | Number of TDTCSs 142 associated with this TDCS |
| COUNT_BUSY_TCS | 4 (16 bits valid, reset reserved) | Number of busy TDTCSs associated with this TDCS |
| KID_ENTRY_0* | 8 (8 bits valid, rest reserved) | Ephemeral Key Id* for Key assigned to TD 190A during TDCREATE |
| KID_ENTRY_1 | 8 (8 bits valid, rest reserved) | Key Id 1 assigned to TD during TDCREATE. TD Can assign a key via PCONFIG. |
| KID_ENTRY_2 | 8 (8 bits valid, rest reserved) | Key Id 2 assigned to TD during TDCREATE. TD Can assign a key via PCONFIG |
| KID_ENTRY_3 | 8 (8 bits valid, rest reserved) | Key Id 3 assigned to TD during TDCREATE. TD Can assign a key via PCONFIG. |
| ATTRIBUTES | 16 (See Table below) | Attributes of Trust Domain |
| MRTD | 48 | SHA-384 measurement 138 oft he initial contents of the TD |
| RESERVED | 16 (must be zero) | Reserved for MREG growth to SHA512. |
| MRSWID | 48 | Software defined identifier for additional logic loaded after initial builds |
| MRCONFIGID | 48 | Software defined identifier for additional TD SW configuration. |
| MROWNER | 48 | Software defined identifier for VM's owner |
| MROWNERCONFIG | 48 | Software defined identifier for additional image config from owner. |
| XCR0 | 8 | Initial values of XCR0 |
| OWNERID | 8 | Owner ID |
| MRTDBLOCKS | 4 | Number of blocks updated into MRTD. (Only needed pre-TDINIT) |
| COUNT_TCS_MAX | | Max value specifies maximum number of logical processors that may be assigned to this TD. |

TABLE 4-continued

TDCS Structure

| Field | Size (bytes) | Description |
| --- | --- | --- |
| RESERVED | | (max possible 4095). Reserved (other TD metadata) 143 |

The TDCS.ATTRIBUTES field has the following bit structure depicted below in Table 5:

TABLE 5

TDCS.ATTRIBUTES field bit structure

| Field | Bit position | Description |
| --- | --- | --- |
| INIT | 0 | This bit specifies if the TD has been initialized by TDINIT. |
| GROUP | 1 | This bit specifies if the TD can share an Ephemeral key for TDs with the same TDCS.OWNERID and TDCS.MRTD. This attribute can be enabled only when the extended MOT is supported. |
| DEBUG | 2 | This bit specifies if the TD is a debug TD (See Section X for TD Debug architecture). |
| RESERVED | 63:3 | Reserved |
| XFRM | 127:64 | XSAVE Feature Request Mask. |
| XFRMS | 255:65 | to express XSAVES supervisor state |

A TD 190A may request the TDRM 180 to assign N logical processor(s) (CPUs) to the TD 190A. For each requested CPU, the TDRM 180 adds a TDTCS 128 page into the TD 190A using TDADDPAGE (parameters <op, TDCS, TD CPU index, HPA>). The processor 112 verifies that destination 4 KB page is assigned to the TD 190A. The processor 112 updates the TCSList [index] 142 in the TDCS 124 for the TD 190A. The TDTCS 128 may back-reference its parent TDCS 124 (which is specified in the TDADD-PAGE instruction parameters) using parent TDCS reference 144.

The TDRM 180 uses the TDTCS 128 to TDENTER (parameters <TDCS, CPU index>) into a TD 190A. This activates the TDTCS 128 (and the referenced TDCS 124). The TDENTER instruction checks that the TDTCS 128 is not already active. On TDENTER, the processor 112 activates the TD 190A Key ID enforcement by the page miss handler (PMH)/TLB. The processor 112 then loads the TD state from the TDTCS 128 and starts the TD 190A execution.

The TDTCS 128 holds the execution state for logical processors assigned to a TD 190A. If a TD exit condition occurs when the processor 112 is in TD Tenant mode, the TD exit saves the execution state of the tenant in the TDTCS 128. In one implementation, the TDTCS 128 is access-controlled via the MOT 160 (e.g., as described above, key ID used during page walks of the processor 112 to prevent unauthorized software read/write). In another implementation, the TDTCS 128 is access-controlled via storage in a restricted range register(s) of the processor 112 that is inaccessible to software accesses.

If the TD exit occurs when the processor 112 is operating in the context of a non-root VMM inside a TD 190A, the TD exit performs a VM exit (e.g., VM exit 280 of FIG. 2B) to the TD VMM (e.g., TD VMM 222) (not reported yet), saves the tenant VMM state in the TDTCS 128, and performs a TD exit (switches key id enforcement). A subsequent TDENTER invoked by the TDRM 180 performs a key-ID enforcement switch, restores tenant state from the TDTCS 128 (inside the TD 190A) in order to resume the tenant VMM or OS. Correspondingly, if the processor 112 was operating in the context of a non-root VMM during a prior TD exit, the TD enter reports a VM exit (on TD entry) to the tenant VMM.

As discussed above, the TDTCS 128 holds the execution state of the TD 190A. The execution state of the TD 190A stored in the TDTCS 128. TDTCS may be non-architectural and may hold the fields detailed below in Tables 6 thru 9:

TABLE 6

TDTCS fields

| Field | Description |
| --- | --- |
| STATE | Execution state of the TD virtual processor. A value of 0 indicates that this TDTCS is available for TDENTER. A value of 1 indicates that the TDTCS is active on a logical processor (is currently executing a TD using this TDTCS). |
| TDCS | Linkage back to "parent" TDCS (64 b HPA) |
| FLAGS | TDTCS execution flags (See Table X below) |
| TD_STATE_S | TD state corresponding to supervisor mode. See Table below. |
| TD_STATE_U | TD state corresponding to user state. See Table below. |

TABLE 7

TDTCS Execution flags

| Field | Bit Position | Description |
| --- | --- | --- |
| DEBUG | 0 | Debug opt-in flag for TDTCS |
| RESERVED | 63:1 | NA |

TABLE 8

TDTCS Supervisor Execution state

| Field | Description |
| --- | --- |
| CR0 | Initial state setup by TDCREATE—subsequent loads apply a mask |
| CR2 | Loaded as saved, initialized to 0 |
| CR3 | Loaded as saved, initialized by TD OS |
| CR4 | Initial state setup by TDCREATE—subsequent loads apply a mask |
| DR0 | Loaded as saved, initialized clear |
| DR1 | Loaded as saved, initialized clear |
| DR2 | Loaded as saved, initialized clear |
| DR3 | Loaded as saved, initialized clear |
| DR6 | Loaded as saved, initialized clear |
| DR7 | Loaded as saved, initialized to disable debug |
| IA32_SYSENTER_CS | Loaded as saved, initialized by TD OS |
| IA32_SYSENTER_ESP | Loaded as saved, initialized by TD OS |
| IA32_SYSENTER_EIP | Loaded as saved, initialized by TD OS |
| SYSCALL MSRs | Loaded as saved, initialized by TD OS |
| IA32_EFER | Loaded as saved, initialized by TD OS |
| IA32_PAT | Loaded as saved, initialized by TD OS |
| IA32_BNDCFGS | Loaded as saved, initialized by TD OS |
| ES Segment Info | Selector, Base, Limit, ARByte |
| CS Segment Info | Selector, Base, Limit, ARByte |
| SS Segment Info | Selector, Base, Limit, ARByte |
| DS Segment Info | Selector, Base, Limit, ARByte |
| FS Segment Info | Selector, Base, Limit, ARByte |
| GS Segment Info | Selector, Base, Limit, ARByte |
| LDTR Segment Info | Selector, Base, Limit, ARByte |
| TR Segment Info | Selector, Base, Limit, ARByte |
| GDTR Base | Loaded as saved, initialized by TD OS |

TABLE 8-continued

TDTCS Supervisor Execution state

| Field | Description |
| --- | --- |
| GDTR Limit | Loaded as saved, initialized by TD OS |
| IDTR Base | Loaded as saved, initialized by TD OS |
| IDTR Limit | Loaded as saved, initialized by TD OS |
| RIP | Loaded as saved, initialized by TDCREATE for IBB |
| RSP | Loaded as saved, initialized by TDCREATE for IBB |
| RFLAGS | Loaded as saved, initialized by TDCREATE for IBB |
| PDPTEs* (32 bit PAE) | Loaded as saved, initialized by TD OS |
| IA32_XSS | Loaded as saved, initialized by TD OS |
| XCRO | Loaded as saved, initialized by TD OS |
| Kernel_GS_BASE | Loaded as saved, initialized by TD OS |
| TSC_AUX | Loaded as saved, initialized by TD OS |

TABLE 9

TDTCS additional fields

| Field | Description |
| --- | --- |
| RAX | Loaded as saved, initialized by TD OS |
| RBX | Loaded as saved, initialized by TD OS |
| RCX | Loaded as saved, initialized by TD OS |
| RDX | Loaded as saved, initialized by TD OS |
| RBP | Loaded as saved, initialized by TD OS |
| RSI | Loaded as saved, initialized by TD OS |
| RDI | Loaded as saved, initialized by TD OS |
| R8 | Loaded as saved, initialized by TD OS |
| R9 | Loaded as saved, initialized by TD OS |
| R10 | Loaded as saved, initialized by TD OS |
| R11 | Loaded as saved, initialized by TD OS |
| R12 | Loaded as saved, initialized by TD OS |
| R13 | Loaded as saved, initialized by TD OS |
| R14 | Loaded as saved, initialized by TD OS |
| R15 | Loaded as saved, initialized by TD OS |
| XSAVE state | Loaded as saved, initialized by TD OS |

In one implementation, a TD 190A may be destroyed by the TDRM 180. The TDRM 180 destroys a TD 190A using TD destroy instructions (TDDESTROY and TDTDE-STROY). The CPU verifies that all memory assigned to the TD has been revoked, and all TDTCSs are destroyed before it allows a TDCS to be destroyed.

Figure 3:
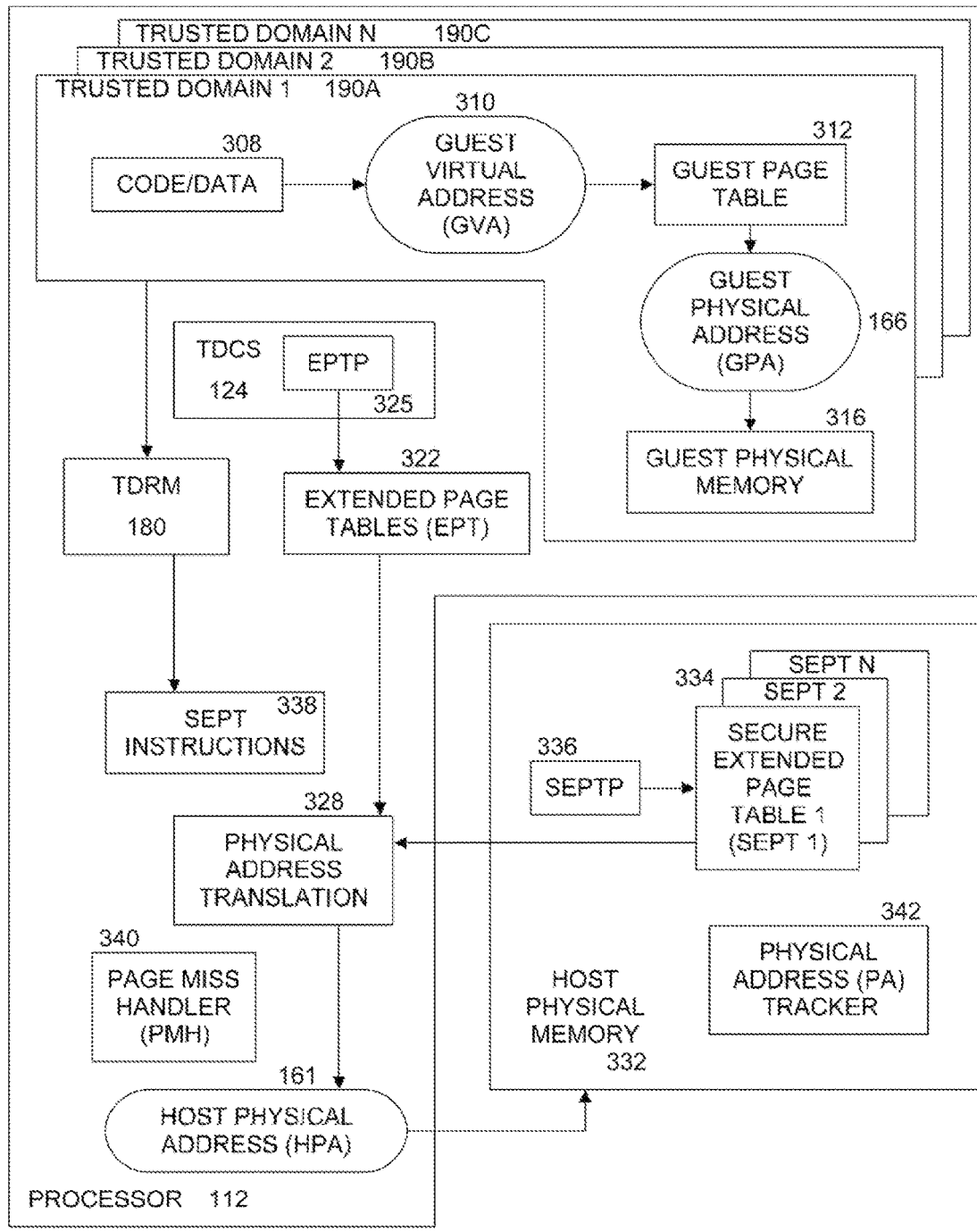
FIG. 3 illustrates an example computing system per some embodiments.

FIG. 3 illustrates an example computing system per some embodiments. One or more Trust Domains (TDs) from TD 1 190A, TD 2 190B, TD N 190C, where N is a natural number, may be instantiated on computing system 300. Each TD includes code/data 308, which may include references to one or more guest virtual addresses (GVAs) 310. To translate a GVA into a physical address that can be used to access a portion of the computing system's physical memory, a TD may use guest page table 312. Thus, GVA 310 may be translated using guest page table 312 to guest physical address (GPA) 166. GPA 166 may then be mapped to a host physical address (HPA) 161 via EPTs 322, to access host physical memory 332.

Figure 4:
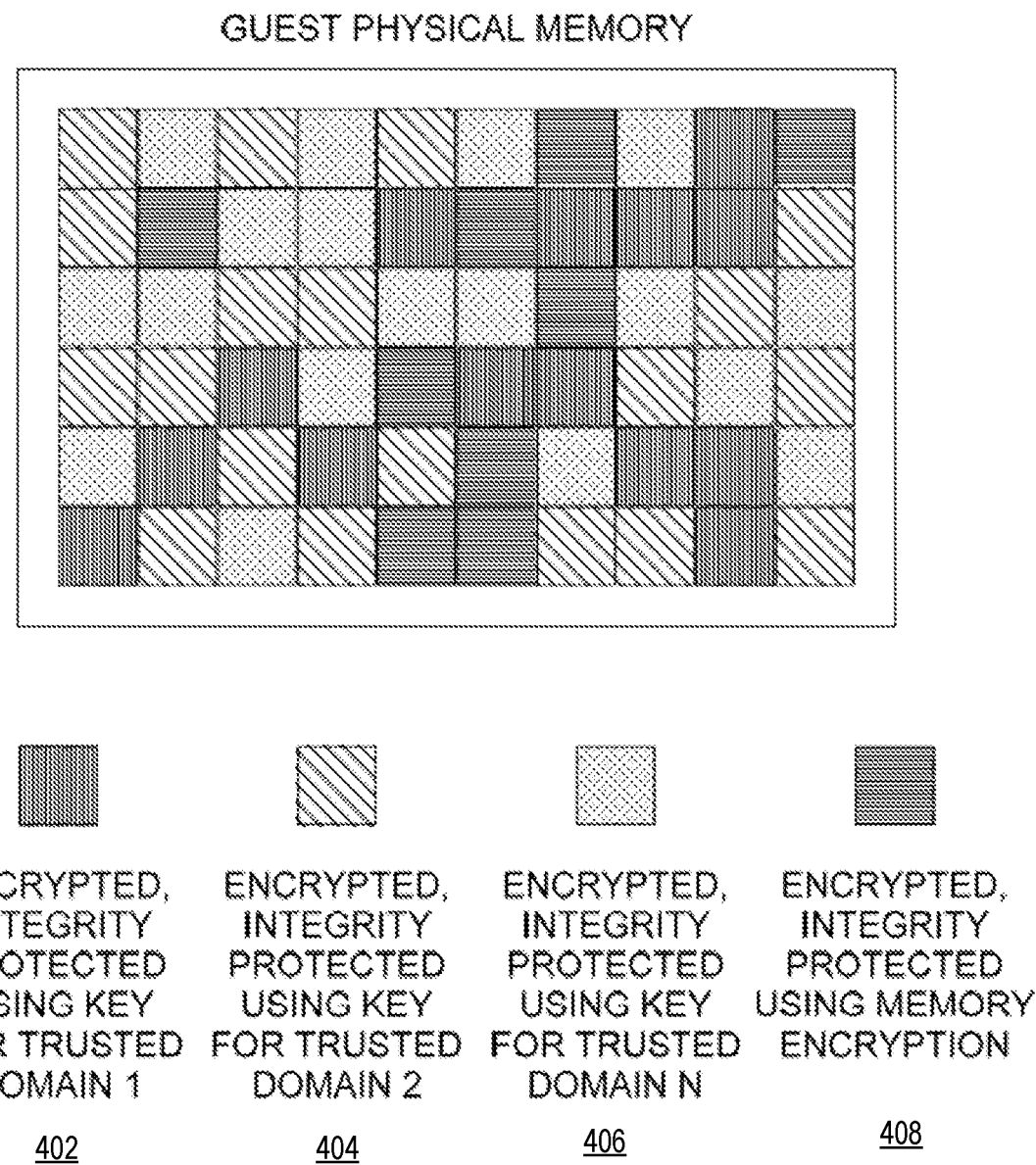
FIG. 4 illustrates an example physical memory.

FIG. 4 illustrates an example guest physical memory 316. In this example, a plurality of memory pages is shown, with each page associated with a TD being protected by encryption using a different key, such as a unique private key for each TD. For example, pages 402 associated with TD 1 190A may be encrypted with TD 1's key, pages 404 associated with TD 2 190B may be encrypted with TD 2's key, and so on, until pages 406 associated with TD N 190C may be encrypted with TD N's key. Pages 408 not associated with a TD may be protected using memory encryption as is known.

Figure 5:
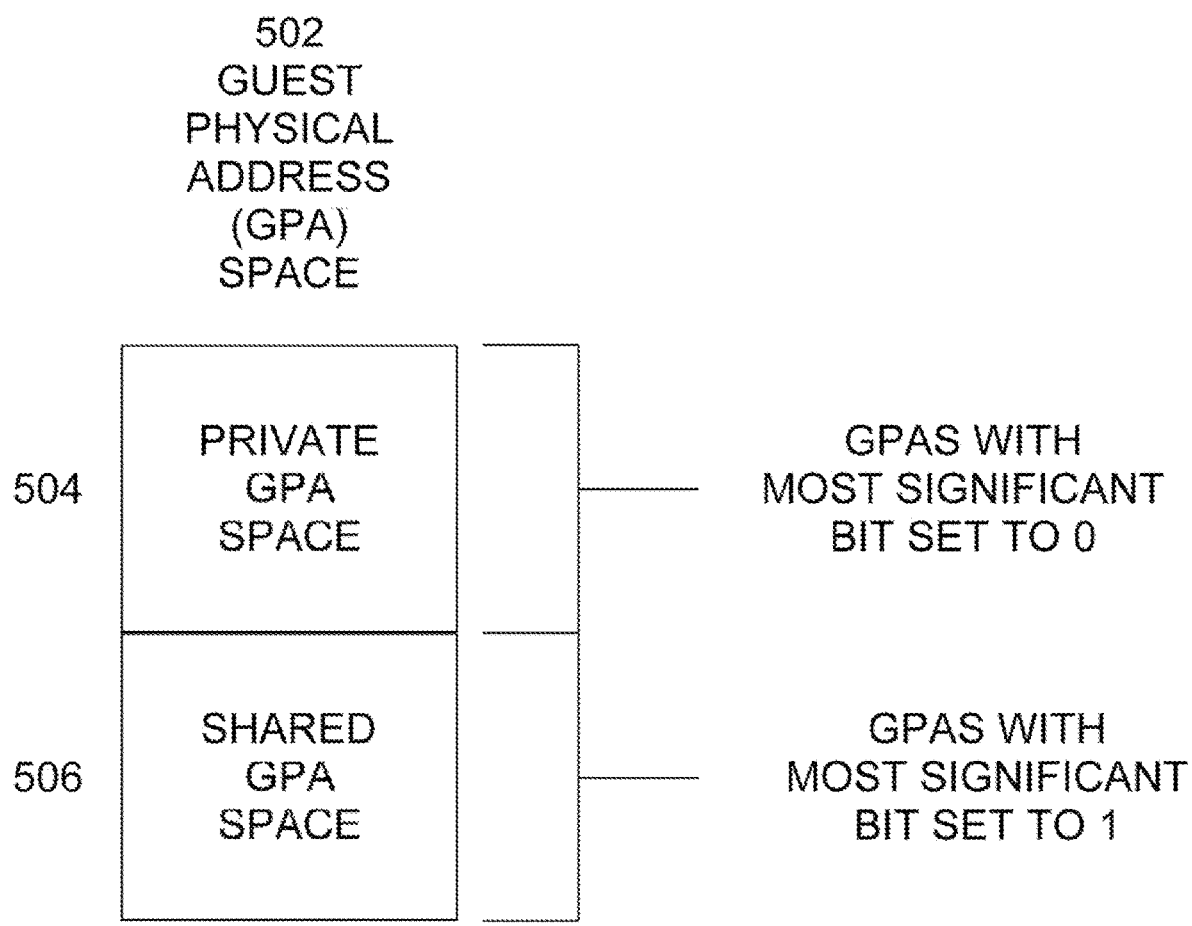
FIG. 5 illustrates an example partition of guest physical address (GPA) space.

FIG. 5 illustrates an example partition of guest physical address (GPA) space. The TD architecture partitions the guest physical address space 502 for guest physical memory 316 into two parts—a private address space 504 and a shared address space 506. Access to pages mapped to private address space 504 may be encrypted and integrity protected with a private key of a TD. Access to pages mapped to the shared address space 506 may be encrypted and integrity protected with a key shared by TD 190A and TDRM 180. In some embodiments, the most significant bit of the GPA is termed as a "Shared" bit. In other embodiments, another predetermined bit of the GPA may be used to indicate shared vs. private status.

Turning back to FIG. 3, TDRM 180 sets up an untrusted EPT 322 that provides the translation of GPA 166 with the "Shared" bit set to 1 (i.e., shared pages). The pointer to this EPT (EPTP) 325 (as specified by the TDRM and stored Trust Domain Control Structure (TDCS) 124) may be programmed by Page Miss Handler (PMH) 340 of processor 112 when the processor enters a TD mode and may be cleared when the processor exits the TD mode.

Embodiments of the present invention introduce one or more secure EPTs (SEPTs) 334 that may be built and managed by the processor 112 hardware. Each TD may have an associated SEPT. After system initialization, the SEPT structure is the same as the EPT, except memory for SEPT pages are protected using TD ephemeral keys (i.e., pages are encrypted and integrity protected). In some embodiments, some of the SW Available/Ignored bits in the SEPT are reserved in the SEPT entries so that the CPU can store micro-architectural state information as needed (such as locks, GPA state, etc.).

The pointer to the SEPT (called SEPTP) 336 may be programmed by Page Miss Handler (PMH) 340 of the processor when the processor enters a TD mode and is cleared when the processor exits TD mode. SEPTs 334 and SEPTP 336 may be stored in a protected area of host physical memory 332 and may not be accessible by or known by TDs. SEPTs 334 and SEPTP 336 may only be accessed by certain components of processor 112 such as page miss handler 340, SEPT instructions 338, and physical address translation 328. In some embodiments, the SEPTs 334 may be stored in protected memory within host physical memory 332. In another embodiment, a SEPT for a TD 190A may be stored in encrypted pages of guest physical memory 316, with the pages being encrypted using the TD's private key.

Figure 6:
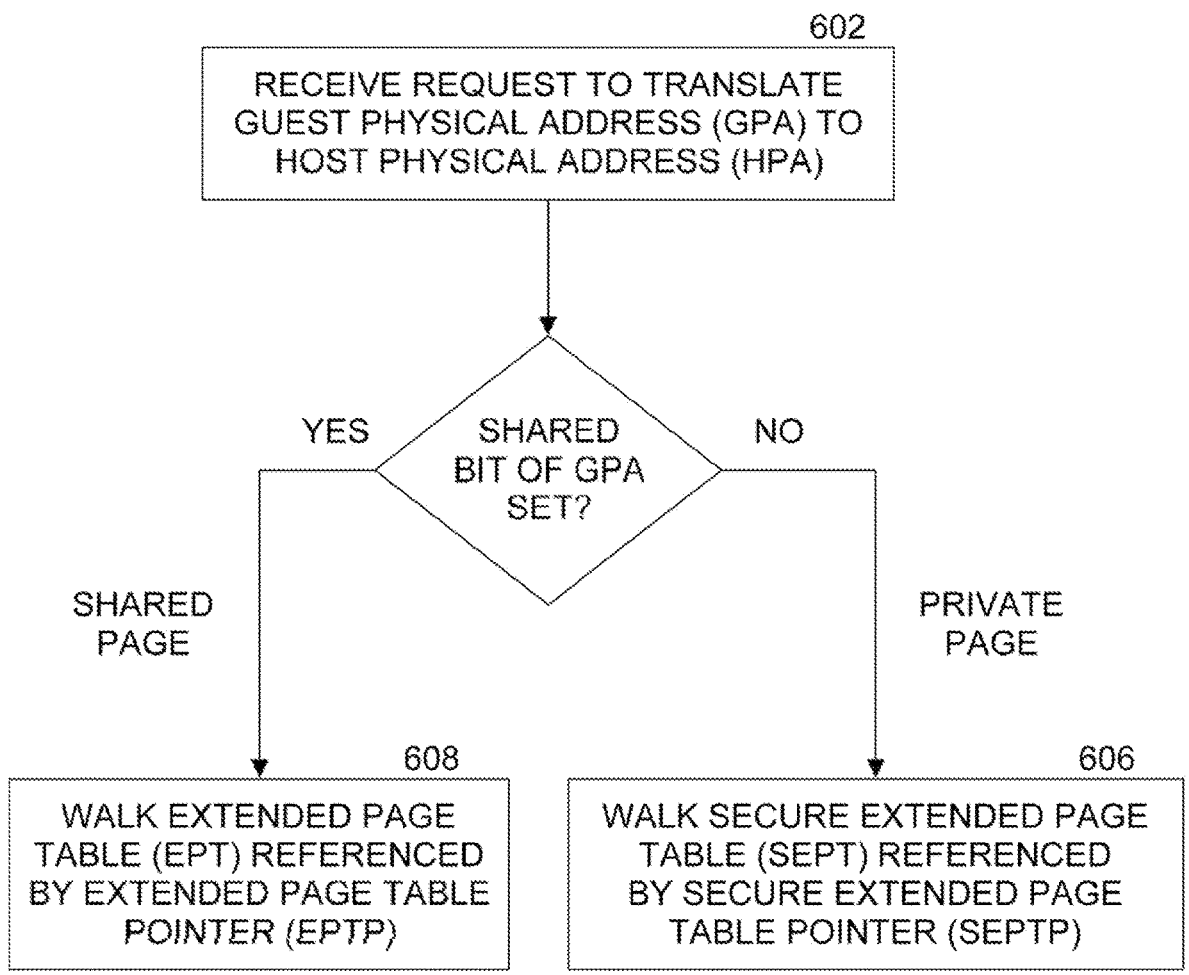
FIG. 6 illustrates an example logic flow of handling address translation for shared pages and private pages.

FIG. 6 illustrates an example logic flow 600 of handling address translation for shared pages and private pages. Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow, in this and later flow diagrams, may be implemented in software, firmware, and/or hardware. In software and firmware embodiments, a logic flow may be implemented by computer executable instructions stored on at least one non-transitory computer readable medium or machine readable medium, such as an optical, magnetic, or semiconductor storage. The embodiments are not limited in this context.

At block 602, PMH 340 receives a request to translate a guest physical address (GPA) 166 to a host physical address (HPA) 161. At block 604, PMH 340 checks the "Shared" bit of the GPA. When the PMH is requested to translate a GPA with the "Shared" bit set to 0 (i.e., a private page) to a HPA at block 606 the PMH walks (i.e., using known page address translation techniques) the SEPT 334 referenced by the SEPTP 336. For a GPA with "Shared" bit set to 1 (i.e., a shared page), at block 608 the PMH walks the EPT 322 referenced by EPTP 325. In other embodiments, the meaning of the shared bit may be flipped (i.e., a 0 means a private page and a 1 means a shared page). Fault handling/reporting changes may include that if any EPT violations are observed when the SEPTP 336 is used (for "Shared bit"=0 GPAs), an EPT violation exit qualification reports that the TD Exit occurred due to an EPT violation in the SEPT 336. Other embodiments may prevent the TD from executing further if such an EPT violation occurs from SEPT 336.

Since SEPTs 336 are built and managed by the processor (e.g., processor 112), TDRM 180 (or a legacy VMM) cannot influence the GPA to HPA translations for private pages that are performed using the SEPT 334. The VMM 180 specifies the GPA to HPA when assigning pages, but once assigned cannot maliciously remap the GPA without the TD 190A being aware of it.

Turning back now to FIG. 3, physical address (PA) tracker component 342, also called Physical Address Metadata Table (PAMT), is a page meta-data table (e.g., per 4 KB, 2 MB, or another page size) stored by the CPU in protected memory so that software can never access it. In some embodiments, the PA tracker is used to keep state information for each page with the following fields: PAMT.TYPE=page type—e.g., Regular, Free, TDCS, TD virtual processor state (TDVPS), TD state save area (TDSSA), SEPT, PMDSA, etc.; PAMT.OWNER=TDID for Regular, TDVPS for TDSSA; PAMT.EPOCH=for translation lookaside buffer (TLB) tracking; PAMT.LOCK=for page locking.

Figure 7:
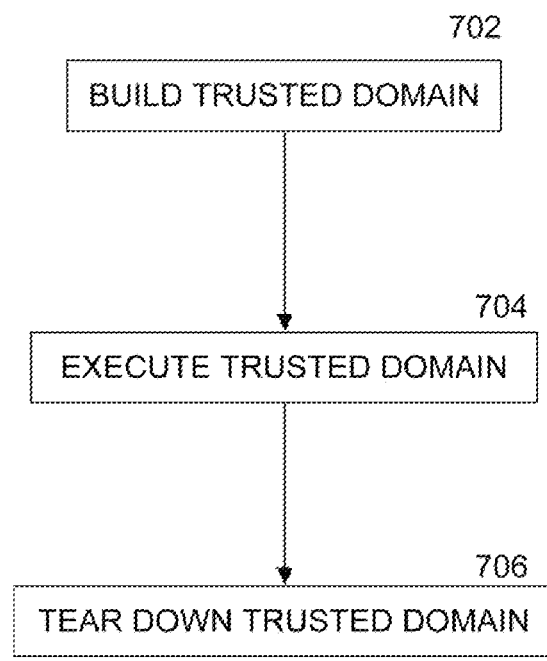
FIG. 7 illustrates an example logic flow for building, executing, and tearing down trust domains.

FIG. 7 illustrates an example logic flow 700 for building, executing, and tearing down trust domains. The TD lifecycle shown in FIG. 7 covers all ISA and hardware interactions for TD memory management. At block 702, a trust domain (TD) may be built. In some embodiments, a TD Build Memory assignment/measurement) may include operations to add SEPT pages and mappings (by using a TDADDSEPT instruction), add pages to the TD with measurement (by using TDADDPAGE and TDEXTEND instructions), and add zero pages to TD post measurement (by using a TDAUGPAGE instruction).

At block 704 a trust domain may be executed. In some embodiments, TD execution (e.g., use of assigned memory triggers PMH 340 behaviors described above) may include operations for memory paging (by using TDBLOCKPAGE, TDEVICT, and TDRELOAD instructions), and for memory Frag/Defrag (by using TDBLOCKPAGE, TDPROMOTE, and TDDEMOTE instructions).

At block 706, a trust domain may be torn down. In some embodiments, TD teardown may include operations for memory deallocation (by using TDBLOCKPAGE, and TDREMOVE instructions), and memory reclaim for SEPT 134 pages (by using a TDREMOVEPAGE instruction).

Figure 8:
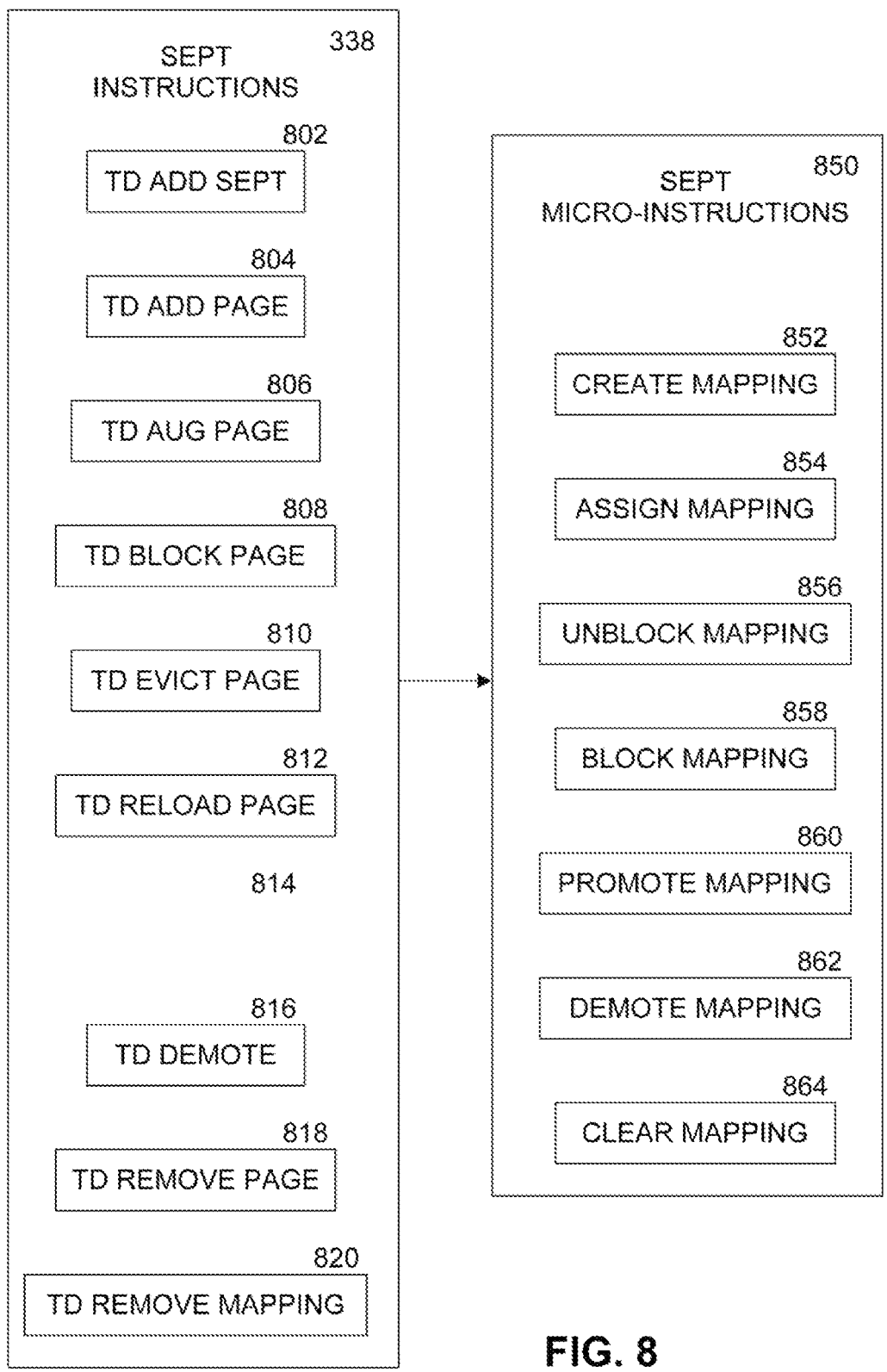
FIG. 8 illustrates an example set of secure extended page table (SEPT) instructions.

The processor provides instructions available to TDRM 180 to call to manage SEPTs 334. FIG. 8 illustrates an example set of secure extended page table (SEPT) instructions 338.

TDADDSEPT 802 This instruction adds a GPA 166 to HPA 161 mapping to the SEPT 334. This instruction adds a mapping to translate the GPA to HPA but sets the mapping as blocked from access. This mapping can be made valid only when the page HPA 161 is physically assigned to the TD 190A using the TDADDPAGE or TDAUGPAGE instruction. This instruction uses the Create Mapping micro-instruction described below to update SEPT 334.

TDADDPAGE 804 This instruction adds a page to the TD 190A. The TDRM 180 specifies the initial contents of this page through a parameter. This instruction first copies the initial contents to the page such that the contents are encrypted with the private encryption key of TD 190A. Subsequently, this instruction also updates and makes the corresponding translation in the SEPT 334 valid such that the TD 190A can now access these pages. This instruction uses the Assign Mapping and Unblock Mapping micro-instructions described below to update SEPT 334.

TDAUGPAGE 806 This instruction is similar to TDADD-PAGE but instead of copying an initial content into the page, the instruction initializes the page to zero. This instruction uses the Assign Mapping and Unblock Mapping micro-instructions described below to update SEPT 334.

TDBLOCKPAGE 808 This instruction updates the SEPT 334 mapping of the specified page to a blocked state such that the page cannot be accessed anymore from the TD 190A. This instruction uses the Block Mapping micro-instruction described below to update SEPT 334.

TDEVICTPAGE 810 This instruction updates the SEPT 334 mapping of the specified page to a blocked state such that the page cannot be accessed anymore from the TD 190A. This instruction uses the Block Mapping micro-instruction described below. This instruction then generates a processor key integrity enforced page meta-data that includes GPA 166, permissions and the page contents, so that the TDRM can use the HPA 166 for another TD 190B or VM.

TDRELOADPAGE 812 This instruction first validates the integrity of the page meta-data provided by TDRM 180 and updates the SEPT 334 mapping of the specified GPA 166 passing the integrity checked meta-data to the Assign Mapping and Unblock Mapping micro-instructions described below.

TDPROMOTE 814 This instruction is used by TDRM 180 to TDEVICT/TDRELOAD 4k pages into a contiguous 2 MB region of memory to "promote" to a larger TLB mapping. The TDRM must track what HPAs 161 are assigned to TDs 190A, 190B, . . . 190C in its page frame number (PFN) database. All operating systems/VMMs that implement memory management manage the state of physical pages in a PFN database. TDRM can then subsequently request promotion/demotion of SEPT structures via this instruction which uses the Promote Mapping micro-instruction described below.

TDDEMOTE 816 This instruction is used by the TDRM to fragment a large page into a contiguous region of smaller pages to demote TLB mappings. The TDRM must track what HPAs 161 are fragmented for the TD 190A in its PFN database. The instruction updates the SEPT 334 structures via the Demote Mapping micro-instruction described below.

TDREMOVEPAGE 818 This instruction removes a page from the TD 190A. The instruction can only be performed for pages that have been previously added to a TD 190A via TDADDPAGE. (i.e., the page may not be removed until one or more valid mapping exists for the HPA 161 in the SEPT 334).

TDREMOVEMAPPING 820 This instruction removes a blocked mapping for a GPA 166 from the SEPT 334 and converts pages back to TDRM 180 ownership when no more outgoing references remain from the SEPT pages. Paging for SEPT pages 334 can be supported by similar TDMAPPINGEVICT and TDMAPPINGRELOAD variants for EPT 122 pages which store specific meta-data for SEPT 334 metadata (as opposed to regular TD pages). In some embodiments, the instructions TDWBPAGE, TDLDPAGE (not shown in FIG. 8) mark the GPA in the SEPT as "evicted" and then capture the state of the page and encrypt it with a paging key, and the hash of the page, the GPA, and the attributes.

FIG. 8 also illustrates an example set of SEPT micro-instructions 850 used in implementing the SEPT instructions 338 discussed above.

Create Mapping 852 takes in a GPA 166 as an input parameter to be mapped via SEPT 334 and one HPA 161 destination (no source) to add SEPT pages and insert mappings. Processor 112 verifies GPA 166 does not have the "Shared" bit set, else returns an error. Processor 112 performs a page walk (processor enforces HPAs 161 are not self-referential) through SEPT 334 for the provided GPA 166 establishing if a new HPA 161 is needed. During the page walk, if the page walk requires a new page for the mapping to be complete, the processor does a read check on the provided HPA using a TDRM key ID to ensure that the page is an ordinary page not assigned to any other TD 190A, . . . 190C. Alternately, the processor may use a bit map (looked up HPA) to perform this check. If the page is an ordinary page, then the processor uses the TD Key ID to perform a series of MOVDIR64 operations to clear the SEPT page directory entry (PDE)/page table entry (PTE) page (effectively updating the integrity check value in the memory controller and converting the page to a TD page). For a non-leaf extended page table entry (EPTE), the processor read-modify-writes a cache line with a modified extended page directory/table (x) cache entry (EPxE) to refer to the added HPA 161, updates a reference count for upper level EPxE. If more pages are needed for the mapping to be fully specified, the processor returns an error code to report to the OS, otherwise for a leaf EPTE, processor 112 read-modify-writes a cache line with the modified EPxE to mark GPA 166 as not-present (thus blocking the mapping).

Assign Mapping 854 takes in GPA 166, permissions, an effective address of source page and a destination HPA 161 for a final page to be assigned to the TD 190A, as input parameters. Processor 112 verifies the GPA 166 does not have the "Shared" bit set. The processor performs a page walk returning an error when the processor stalls/needs more pages (then TDRM should use TDADDSEPT to fix the error). If the page walk completes successfully, the processor checks if the mapping is marked as not-present (i.e., a blocked state). For the destination HPA 161, the processor does a read check on the provided HPA using the TDRM key ID to ensure that the page is an ordinary page not assigned to the same or another TD 190A, . . . 190C. This check also prevents aliases to the same TD page. Alternately, the processor may use a bit map (looked up HPA) to perform this check. If this check passes successfully then the processor performs a series of MOVDIR64 writes to the HPA to copy data from the source page to the destination page (either with content or zeros depending on the parameter). For the final EPTE page entry, the processor read-modify-writes to modify EPTE with the destination HPA, perms, and marks it as not-present (i.e., blocked); and updates a reference count on L2 EPTE.

Unblock Mapping 856 takes in GPA 166 as an input parameter. The processor verifies the GPA does not have the "Shared" bit set. The processor performs a page walk returning an error when the processor stalls/needs more pages (then TDRM 180 should use the TDADDSEPT instruction to fix the error). If the page walk completes successfully, the processor checks if the mapping is marked as not-present (i.e., a blocked state). For final EPTE page entry, the processor read-modify-writes to modify EPTE to mark it as present (i.e., unblocked). In some embodiments, the Assign Mapping and Unblock Mapping micro-instructions may be combined for optimizing operations.

Block Mapping 858 takes in GPA 166 as an input parameter. The processor verifies GPA does not have the "Shared" bit set. Processor 112 performs a page walk returning an error when the processor stalls/needs more pages (then TDRM should use the TDADDSEPT instruction to fix the error). If the page walk completes successfully, the processor checks if the mapping is marked as present (i.e., not a blocked state). For final EPTE page entry, the processor read-modify-writes to modify EPTE to mark it as not-present (blocked).

Promote Mapping 860 takes in a GPA 166 and desired size as input parameters. Processor 112 verifies GPA does not have the "Shared" bit set. The processor performs a page walk returning an error when the processor stalls/needs more pages (then TDRM should use the TDADDSEPT instruction to fix the error). If the walk completes successfully, the processor checks if the mapping is marked as not-present (i.e., a blocked state). The processor checks the PDE for the reference count maintained at inner levels (for lower levels) via 9 EPTE available bits and that the page table entry (PTE) page is fully populated (i.e., 512 entries), and all entries are contiguous in HPA space and are marked as blocked. On a success, the processor returns the HPA of the intermediate SEPT page 334 so that the TDRM can TDREMOVE those pages, and unblocks the 2 MB mapping in the SEPT.

Demote Mapping 862 takes in a first HPA, GPA 166, and desired (smaller) size as input parameters. Processor 112 verifies GPA does not have "Shared" bit set. The processor performs a page walk returning an error when the processor stalls/needs more pages (then TDRM should use the TDADDMAPPING instruction to fix the error). If the walk completes successfully, the processor checks if the mapping is marked as not-present (i.e., a blocked state). The processor checks that the leaf EPTE page size should be larger than desired (smaller) size and caches a second HPA of the EPTE and a third HPA of the destination large page. For the first fragmented GPA (for example, the first 4 KB of 2 MB region), the processor uses the Create Mapping micro-instruction passing in the GPA of the first fragment region and the first HPA to initialize the new PTE page. On success, for the remaining fragments, the processor uses the Assign Mapping and Unblock Mapping micro-instructions (using offsets from GPA and the third HPA3) to update the EPTEs corresponding to each fragment in the PTE page setup by the Create Mapping micro-instruction in the prior step. The processor updates the reference count for the upper level EPTE (i.e., the second HPA2).

Clear Mapping 864 takes in a GPA 166 as an input parameter. Processor 112 verifies GPA does not have the "Shared" bit set, else the processor returns an error. The processor performs a page walk (processor enforces that HPAs 161 are not self-referential) through SEPT 334 for the provided GPA, establishing if SEPT 334 is not setup, if not the processor returns an error. On reaching the leaf EPTE (the processor caches the previous level entry HPA), the processor read-modify-writes the cache line to update the leaf EPxE to clear the HPA and mark EPTE as not-present (thus blocking the mapping). The processor updates an upper-level reference count, and the processor returns the level and reference count to the OS (so that the OS can retry recursively to remove all SEPT pages).

Exemplary Processor Architectures and Data Types

Figure 9:
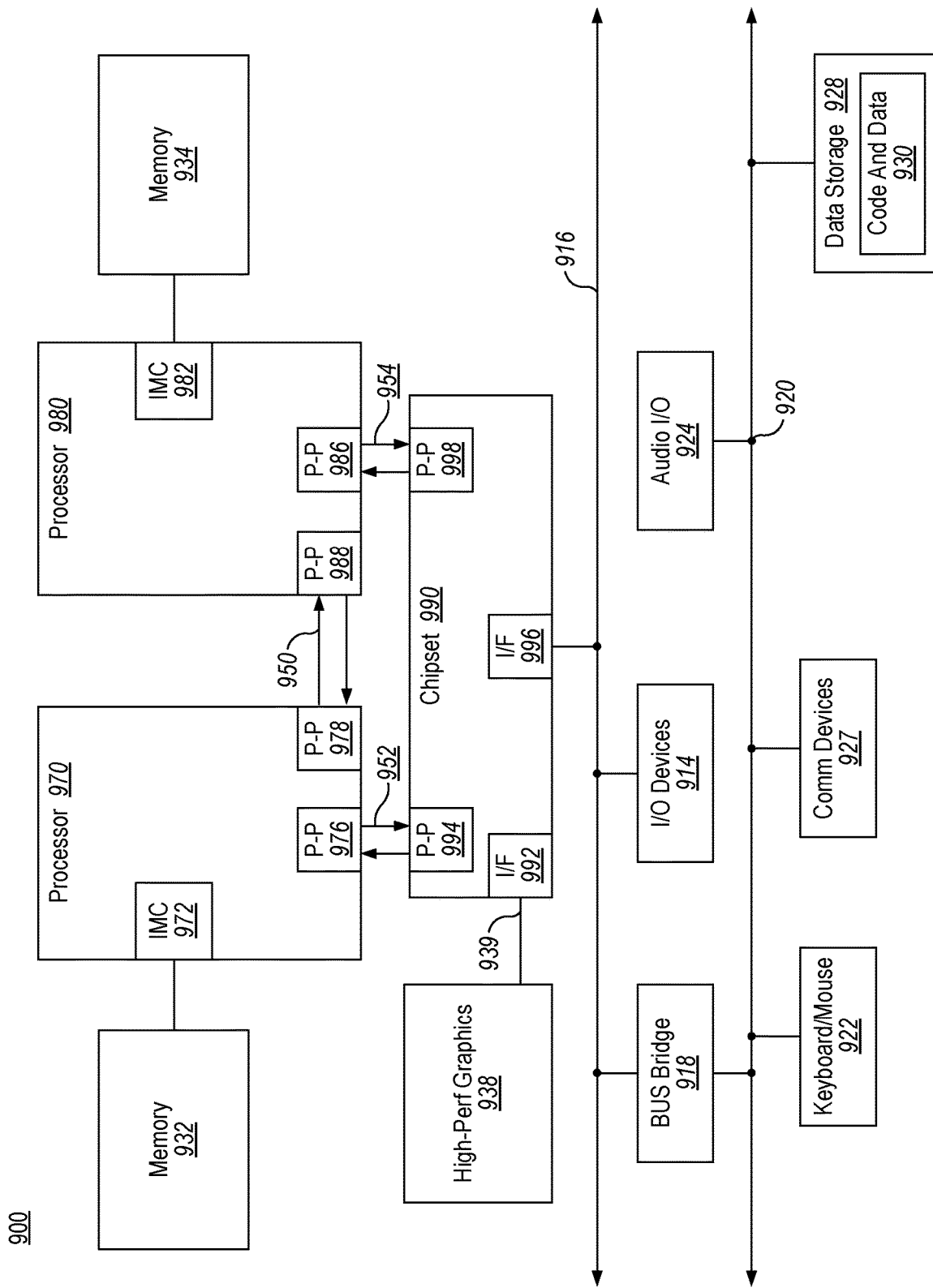
FIG. 9 is a block diagram of a computer system according to one implementation.

Implementations may be implemented in many different system types. Referring now to FIG. 9, shown is a block diagram of a multiprocessing device system 900 in accordance with an implementation. As shown in FIG. 9, multiprocessing device system 900 is a point-to-point interconnect system, and includes a first processing device 970 and a second processing device 980 coupled via a point-to-point interconnect 950. As shown in FIG. 9, each of processing devices 970 and 980 may be multicore processing devices, including first and second processing device cores (not shown), although potentially many more cores may be present in the processing devices. The processing devices each may include hybrid write mode logics in accordance with an implementation of the present. The implementations of the providing isolation in virtualized systems using trust domains can be implemented in the processing device 970, processing device 980, or both.

While shown with two processing devices 970, 980, it is to be understood that the scope of the disclosure is not so limited. In other implementations, one or more additional processing devices may be present in a given processing device.

Processing devices 970 and 980 are shown including integrated memory controller units 972 and 982, respectively. Processing device 970 also includes as part of its bus controller units point-to-point (P-P) interfaces 976 and 978; similarly, second processing device 980 includes P-P interfaces 986 and 988. Processing devices 970, 980 may exchange information via a point-to-point (P-P) interface 950 using P-P interface circuits 978, 988. As shown in FIG. 9, IMCs 972 and 982 couple the processing devices to respective memories, namely a memory 932 and a memory 934, which may be portions of main memory locally attached to the respective processing devices.

Processing devices 970, 980 may each exchange information with a chipset 990 via individual P-P interfaces 952, 954 using point to point interface circuits 976, 994, 986, 998. Chipset 990 may also exchange information with a high-performance graphics circuit 938 via a high-performance graphics interface 939.

A shared cache (not shown) may be included in either processing device or outside of both processing devices, yet connected with the processing devices via Pp interconnect, such that either or both processing devices' local cache information may be stored in the shared cache if a processing device is placed into a low power mode. Chipset 990 may be coupled to a first bus 916 via an interface 996. In one implementation, first bus 916 may be a Peripheral Component Interconnect (PCI) bus, or a bus such as a PCI Express bus, or another third generation I/O interconnect bus, although the scope of the disclosure is not so limited.

As shown in FIG. 9, various I/O devices 914 may be coupled to first bus 916, along with a bus bridge 918 which couples first bus 916 to a second bus 920. In one implementation, second bus 920 may be a low pin count (LPC) bus. Various devices may be coupled to second bus 920 including, for example, a keyboard and/or mouse 922, communication devices 927, and a storage unit 928 such as a disk drive or other mass storage device which may include instructions/code and data 930, in one implementation. Further, an audio I/O 924 may be coupled to second bus 920. Note that other architectures are possible. For example, instead of the point-to-point architecture of FIG. 9, a system may implement a multi-drop bus or other such architecture.

Figure 10:
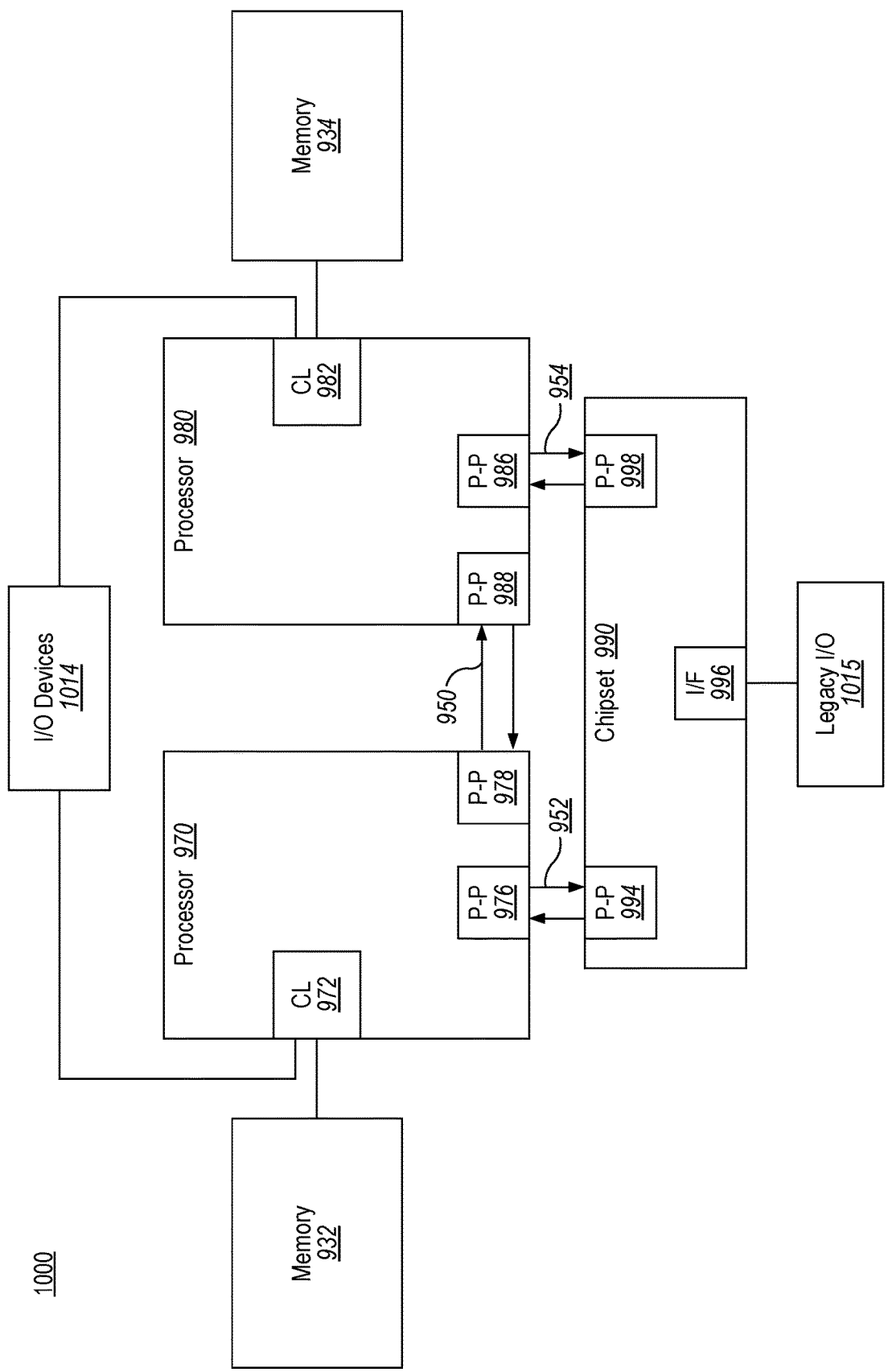
FIG. 10 is a block diagram of a computer system according to another implementation.

Referring now to FIG. 10, shown is a block diagram of a third system 1000 in accordance with an implementation of the disclosure. FIG. 10 illustrates that the processing devices 970, 980 may include integrated memory and I/O control logic ("CL") 972 and 982, respectively. For at least one implementation, the CL 972, 982 may include integrated memory controller units such as described herein. In addition, CL 972, 982 may also include I/O control logic. FIG. 9 illustrates that the memories 932, 934 are coupled to the CL 972, 982, and that I/O devices 1014 are also coupled to the control logic 972, 982. Legacy I/O devices 1015 are coupled to the chipset 990. The implementations of the providing isolation in virtualized systems using trust domains can be implemented in processing device 970, processing device 980, or both.

Figure 11:
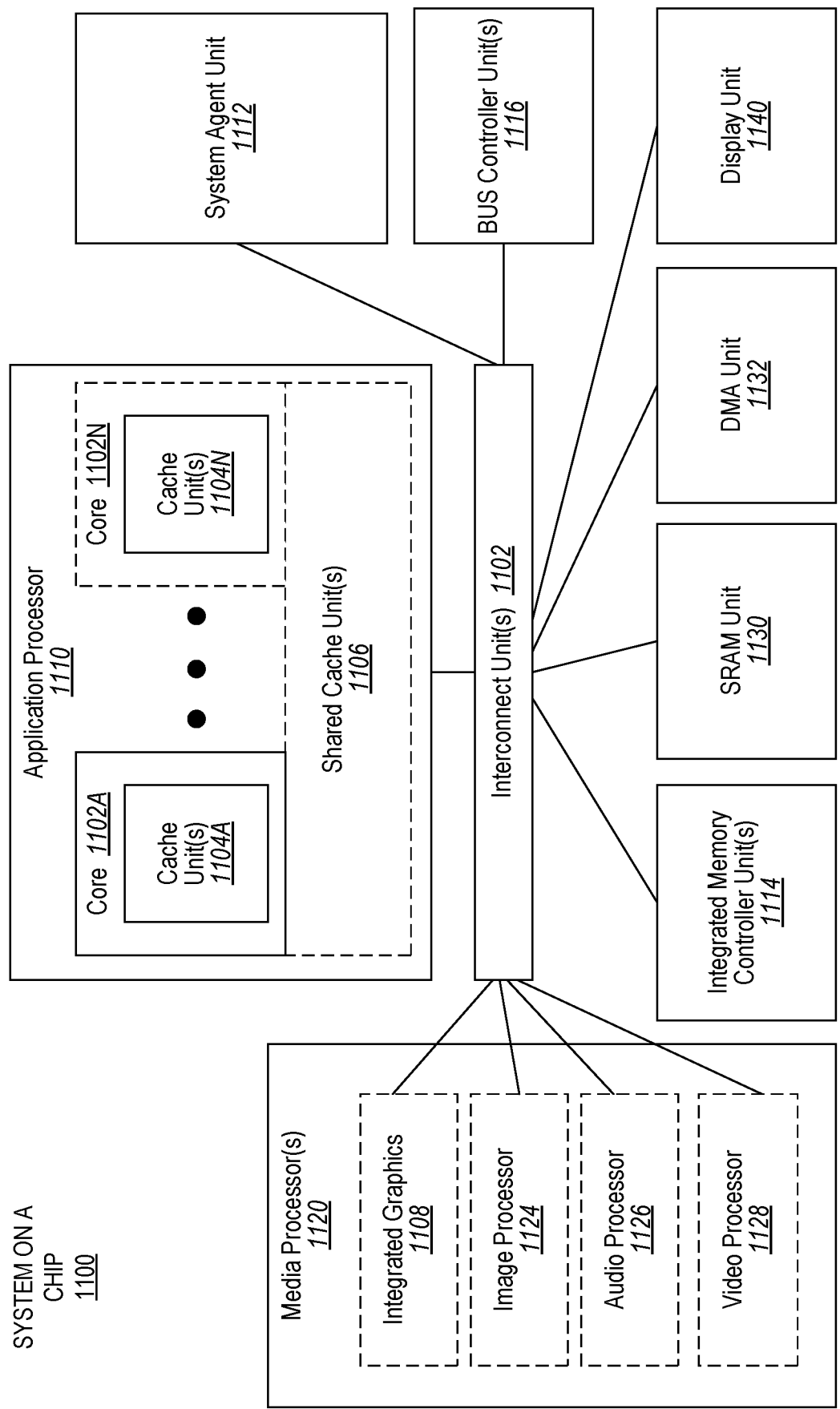
FIG. 11 is a block diagram of a system-on-a-chip according to one implementation.

FIG. 11 is an example system on a chip (SoC) that may include one or more of the cores 1102. Other system designs and configurations known in the arts for laptops, desktops, handheld PCs, personal digital assistants, engineering workstations, servers, network devices, network hubs, switches, embedded processing devices, digital signal processing devices (DSPs), graphics devices, video game devices, set-top boxes, micro controllers, cell phones, portable media players, handheld devices, and various other electronic devices, are also suitable. In general, a huge variety of systems or electronic devices capable of incorporating a processing device and/or other execution logic as disclosed herein are generally suitable.

Referring now to FIG. 11, shown is a block diagram of a SoC 1100 in accordance with an implementation of the disclosure. Also, dashed lined boxes are features on more advanced SoCs. In FIG. 11, an interconnect unit(s) 1102 is coupled to an application processing device 1110 which includes a set of one or more cores 1102A-N and shared cache unit(s) 1106; a system agent unit 1112; a bus controller unit(s) 1116; an integrated memory controller unit(s) 1114; a set or one or more media processing devices 1120 which may include integrated graphics logic 1108, an image processing device 1124 for providing still and/or video camera functionality, an audio processing device 1126 for providing hardware audio acceleration, and a video processing device 1128 for providing video encode/decode acceleration; a static random access memory (SRAM) unit 1130; a direct memory access (DMA) unit 1132; and a display unit 1140 for coupling to one or more external displays. The implementations of the providing isolation in virtualized systems using trust domains can be implemented in SoC 1100.

Figure 12:
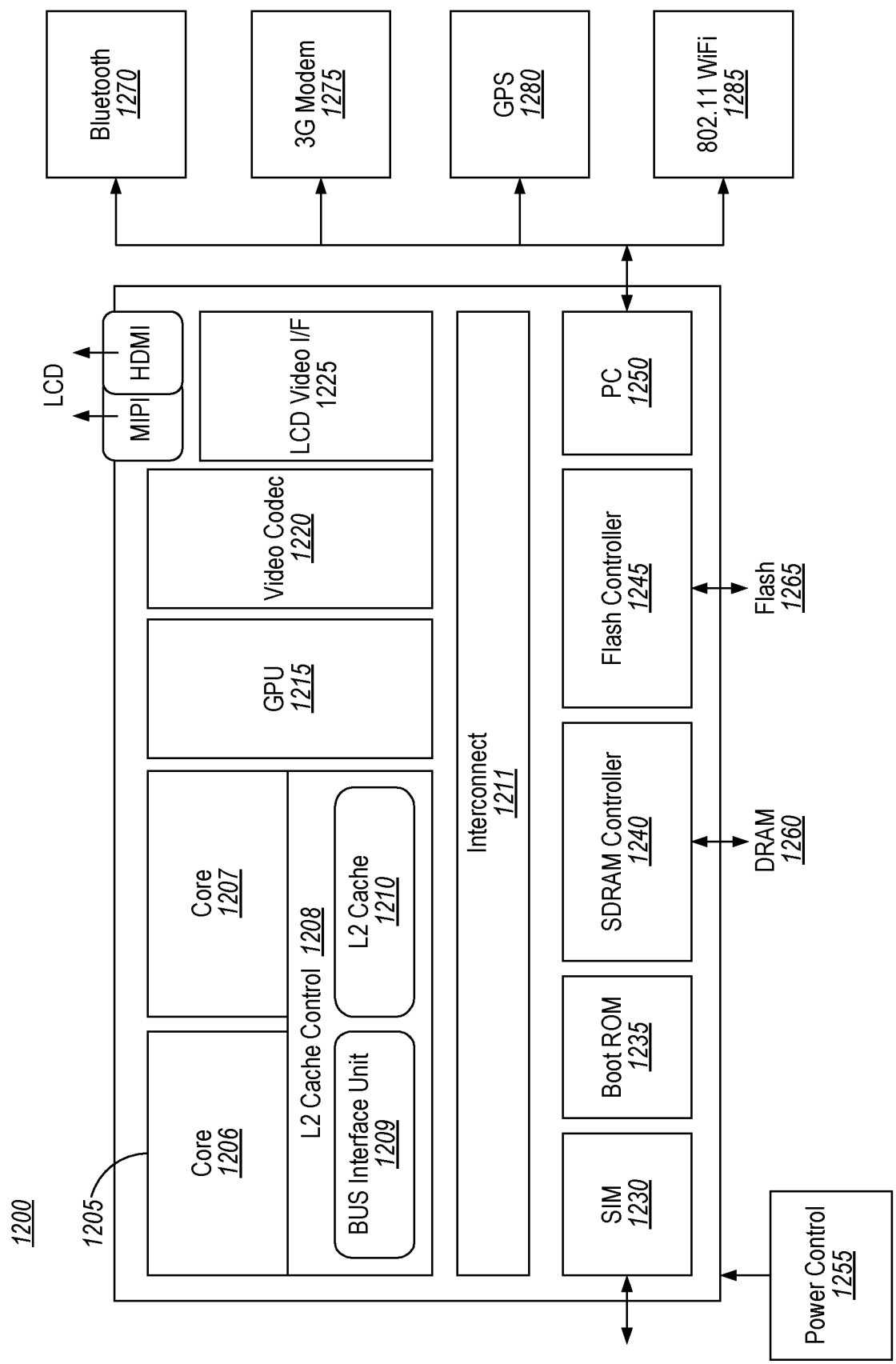
FIG. 12 illustrates another implementation of a block diagram for a computing system.

Turning next to FIG. 12, an implementation of an SoC design in accordance with implementations of the disclosure is depicted. As an illustrative example, SoC 1200 is included in user equipment (UE). In one implementation, UE refers to any device to be used by an end-user to communicate, such as a hand-held phone, smartphone, tablet, ultra-thin notebook, notebook with broadband adapter, or any other similar communication device. A_UE may connect to a base station or node, which can correspond in nature to a mobile station (MS) in a GSM network. The implementations of the providing isolation in virtualized systems using trust domains can be implemented in SoC 1200.

Here, SoC 1220 includes 2 cores—1206 and 1207. Similar to the discussion above, cores 1206 and 1207 may conform to an Instruction Set Architecture, such as a processing device having the Intel® Architecture Core™, an Advanced Micro Devices, Inc. (AMD) processing device, a MIPS-based processing device, an ARM-based processing device design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1211 includes an on-chip interconnect, such as an IOSF, AMBA, or other interconnects discussed above, which can implement one or more aspects of the described disclosure.

Interconnect 1211 provides communication channels to the other components, such as a Subscriber Identity Module (SIM) 1230 to interface with a SIM card, a boot ROM 1235 to hold boot code for execution by cores 1206 and 1207 to initialize and boot SoC 1200, a SDRAM controller 1240 to interface with external memory (e.g., DRAM 1260), a flash controller 1245 to interface with non-volatile memory (e.g., Flash 1265), a peripheral control 1250 (e.g., Serial Peripheral Interface) to interface with peripherals, video codecs 1220 and Video interface 1225 to display and receive input (e.g., touch enabled input), GPU 1215 to perform graphics related computations, etc. Any of these interfaces may incorporate aspects of the implementations described herein.

In addition, the system illustrates peripherals for communication, such as a Bluetooth module 1270, 3G modem 1275, GPS 1280, and Wi-Fi 1285. Note as stated above, a UE includes a radio for communication. As a result, these peripheral communication modules may not all be included. However, in a UE some form of a radio for external communication should be included.

Figure 13:
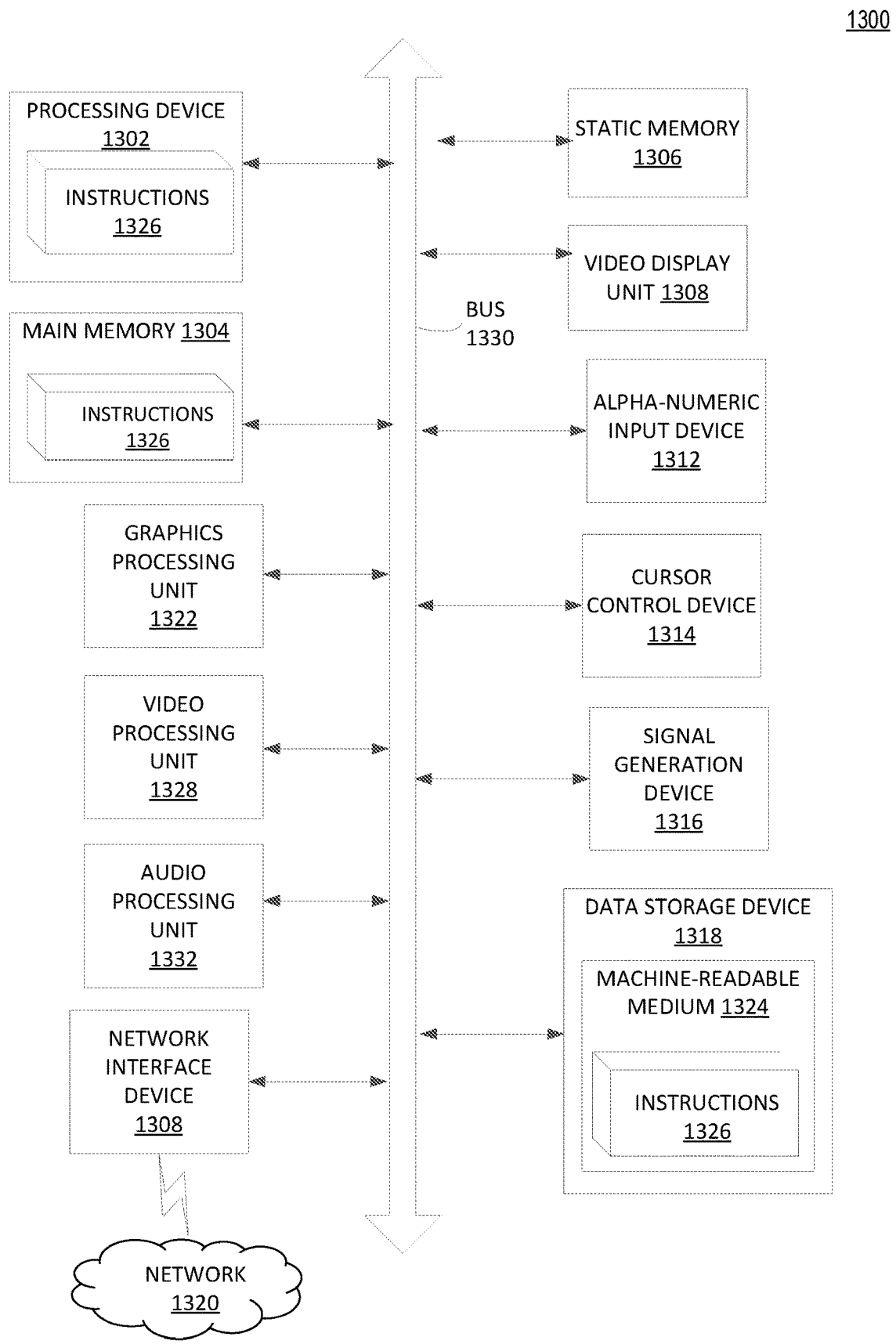
FIG. 13 illustrates another implementation of a block diagram for a computing system.

FIG. 13 illustrates a diagrammatic representation of a machine in the example form of a computing system 1300 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the converting pages and sections can be implemented in computing system 1300.

The computing system 1300 includes a processing device 1302, main memory 1304 (e.g., read-only memory (ROM), flash memory, dynamic random-access memory (DRAM) (such as synchronous DRAM (SDRAM) or DRAM (RDRAM), etc.), a static memory 1306 (e.g., flash memory, static random-access memory (SRAM), etc.), and a data storage device 1318, which communicate with each other via a bus 1330.

Processing device 1302 represents one or more general-purpose processing devices such as a micro-processing device, central processing unit, or the like. More particularly, the processing device may be complex instruction set computing (CISC) micro-processing device, reduced instruction set computer (RISC) micro-processing device, very long instruction word (VLIW) micro-processing device, or processing device implementing other instruction sets, or processing devices implementing a combination of instruction sets. Processing device 1302 may also be one or more special-purpose processing devices such as an application specific integrated circuit (ASIC), a field programmable gate array (FPGA), a digital signal processing device (DSP), network processing device, or the like. In one implementation, processing device 1302 may include one or more processing device cores. The processing device 1302 is configured to execute the processing logic 1326 for performing the operations discussed herein. In one implementation, processing device 1302 can be part of the computing system 100 of FIG. 1A. Alternatively, the computing system 1300 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1300 may further include a network interface device 1308 communicably coupled to a network 1320. The computing system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), a signal generation device 1316 (e.g., a speaker), or other peripheral devices. Furthermore, computing system 1300 may include a graphics processing unit 1322, a video processing unit 1328, and an audio processing unit 1332. In another implementation, the computing system 1300 may include a chipset (not illustrated), which refers to a group of integrated circuits, or chips, that are designed to work with the processing device 1302 and controls communications between the processing device 1302 and external devices. For example, the chipset may be a set of chips on a motherboard that links the processing device 1302 to very high-speed devices, such as main memory 1304 and graphic controllers, as well as linking the processing device 1302 to lower-speed peripheral buses of peripherals, such as USB, PCI, or ISA buses.

The data storage device 1318 may include a computer-readable storage medium 1324 on which is stored software 1326 embodying any one or more of the methodologies of functions described herein. The software 1326 may also reside, completely or at least partially, within the main memory 1304 as instructions 1326 and/or within the processing device 1302 as processing logic 1326 during execution thereof by the computing system 1300; the main memory 1304 and the processing device 1302 also constituting computer-readable storage media.

The computer-readable storage medium 1324 may also be used to store instructions 1326 utilizing the processing device 1302, such as described with respect to FIG. 1A, and/or a software library containing methods that call the above applications. While the computer-readable storage medium 1324 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the implementations. The term "computer readable storage medium" shall accordingly be taken to include, but not be limited to, solid-state memories, and optical and magnetic media.

While the disclosure has been described with respect to a limited number of implementations, those skilled in the art will appreciate numerous modifications and variations therefrom. It is intended that the appended claims cover all such modifications and variations as fall within the true spirit and scope of this disclosure.

In the description herein, numerous specific details are set forth, such as examples of specific types of processing devices and system configurations, specific hardware structures, specific architectural and micro architectural details, specific register configurations, specific instruction types, specific system components, specific measurements/heights, specific processing device pipeline stages and operations, etc. in order to provide a thorough understanding of the disclosure. It will be apparent, however, to one skilled in the art that these specific details need not be employed to practice the disclosure. In other instances, well known components or methods, such as specific and alternative processing device architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the disclosure.

Figure 14:
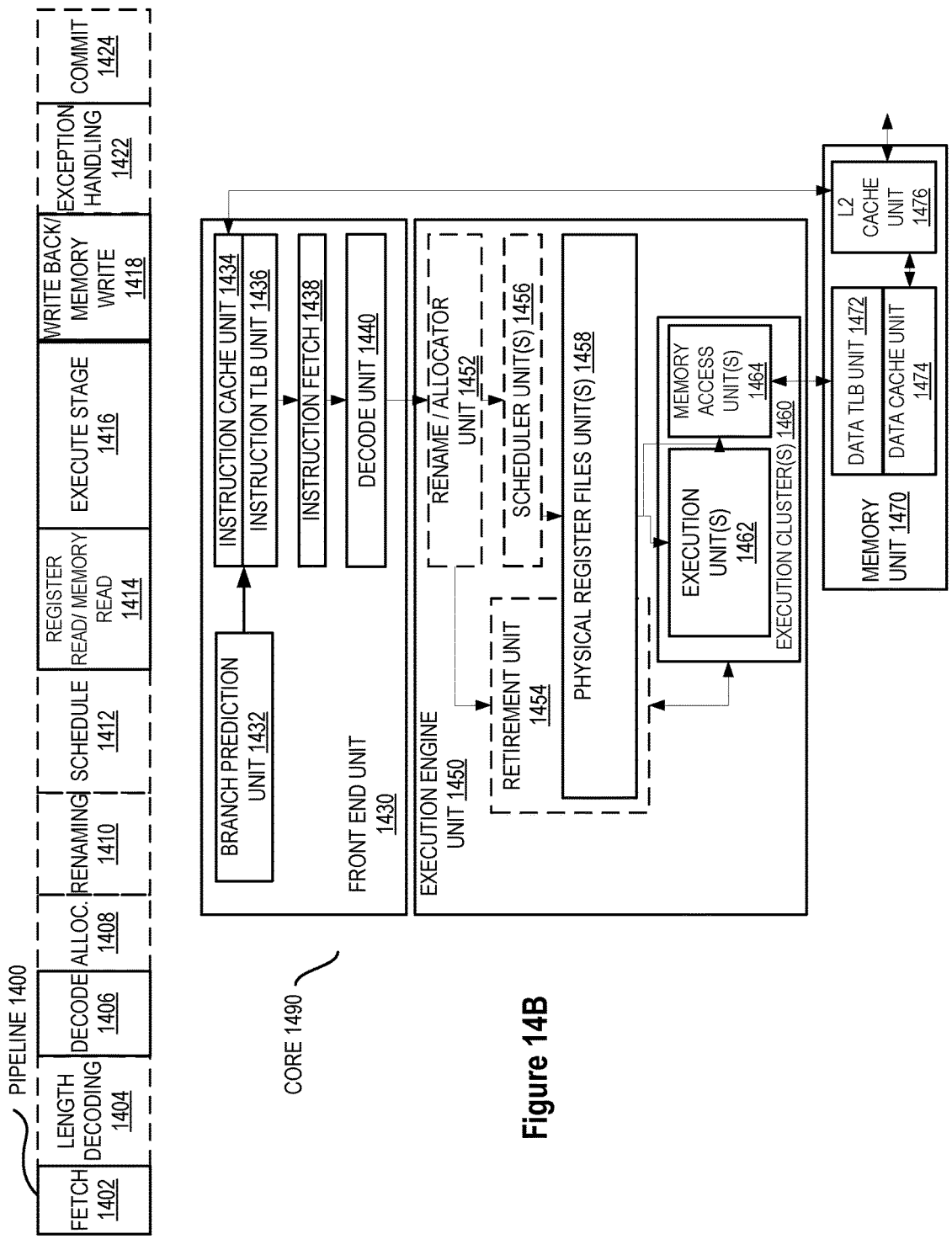
FIG. 14A is a block diagram illustrating both an exemplary in-order pipeline and an exemplary register renaming, out-of-order issue/execution pipeline according to some embodiments.
FIG. 14B is a block diagram illustrating both an exemplary embodiment of an in-order architecture core and an exemplary register renaming, out-of-order issue/execution architecture core to be included in a processor according to some embodiments.

FIG. 14A is a block diagram illustrating both an exemplary in-order pipeline and an exemplary register renaming, out-of-order issue/execution pipeline according to some embodiments. FIG. 14B is a block diagram illustrating both an exemplary embodiment of an in-order architecture core and an exemplary register renaming, out-of-order issue/execution architecture core to be included in a processor according to some embodiments. The solid lined boxes in FIGS. 14A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 14A, a processor pipeline 1400 includes a fetch stage 1402, a length decoding stage 1404, a decode stage 1406, an allocation stage 1408, a renaming stage 1410, a scheduling (also known as a dispatch or issue) stage 1412, a register read/memory read stage 1414, an execute stage 1416, a write back/memory write stage 1418, an exception handling stage 1422, and a commit stage 1424.

FIG. 14B shows processor core 1490 including a front end unit 1430 coupled to an execution engine unit 1450, and both are coupled to a memory unit 1470. The core 1490 may be a reduced instruction set computing (RISC) core, a complex instruction set computing (CISC) core, a very long instruction word (VLIW) core, or a hybrid or alternative core type. As yet another option, the core 1490 may be a special-purpose core, such as, for example, a network or communication core, compression engine, coprocessor core, general purpose computing graphics processing unit (GPGPU) core, graphics core, or the like.

The front-end unit 1430 includes a branch prediction unit 1432 coupled to an instruction cache unit 1434, which is coupled to an instruction translation lookaside buffer (TLB) 1436, which is coupled to an instruction fetch unit 1438, which is coupled to a decode unit 1440. The decode unit 1440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1440 may be implemented using various different mechanisms. Examples of suitable mechanisms include, but are not limited to, look-up tables, hardware implementations, programmable logic arrays (PLAs), microcode read only memories (ROMs), etc. In some embodiments, the core 1490 includes a microcode ROM or other medium that stores microcode for certain macroinstructions (e.g., in decode unit 1440 or otherwise within the front-end unit 1430). The decode unit 1440 is coupled to a rename/allocator unit 1452 in the execution engine unit 1450.

The execution engine unit 1450 includes the rename/allocator unit 1452 coupled to a retirement unit 1454 and a set of one or more scheduler unit(s) 1456. The scheduler unit(s) 1456 represents any number of different schedulers, including reservations stations, central instruction window, etc. The scheduler unit(s) 1456 is coupled to the physical register file(s) unit(s) 1458. Each of the physical register file(s) units 1458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In some embodiments, the physical register file(s) unit 1458 comprises a vector registers unit, a write mask registers unit, and a scalar registers unit. These register units may provide architectural vector registers, vector mask registers, and general-purpose registers. The physical register file(s) unit(s) 1458 is overlapped by the retirement unit 1454 to illustrate various ways in which register renaming and out-of-order execution may be implemented (e.g., using a reorder buffer(s) and a retirement register file(s); using a future file(s), a history buffer(s), and a retirement register file(s); using a set of register maps and a pool of registers; etc.). The retirement unit 1454 and the physical register file(s) unit(s) 1458 are coupled to the execution cluster(s) 1460. The execution cluster(s) 1460 includes a set of one or more execution units 1462 and a set of one or more memory access units 1464. The execution units 1462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1456, physical register file(s) unit(s) 1458, and execution cluster(s) 1460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1464). It should also be understood that where separate pipelines are used, one or more of these pipelines may be out-of-order issue/execution and the rest in-order.

The set of memory access units 1464 is coupled to the memory unit 1470, which includes a data TLB unit 1472 coupled to a data cache unit 1474 coupled to a level 2 (L2) cache unit 1476. In one exemplary embodiment, the memory access units 1464 may include a load unit, a store address unit, and a store data unit, each of which is coupled to the data TLB unit 1472 in the memory unit 1470. The instruction cache unit 1434 is further coupled to a level 2 (L2) cache unit 1476 in the memory unit 1470. The L2 cache unit 1476 is coupled to one or more other levels of cache and eventually to a main memory.

By way of example, the exemplary register renaming, out-of-order issue/execution core architecture may implement the pipeline 1400 as follows: 1) the instruction fetch 1438 performs the fetch and length decoding stages 1402 and 1404; 2) the decode unit 1440 performs the decode stage 1406; 3) the rename/allocator unit 1452 performs the allocation stage 1408 and renaming stage 1410; 4) the scheduler unit(s) 1456 performs the schedule stage 1412; 5) the physical register file(s) unit(s) 1458 and the memory unit 1470 perform the register read/memory read stage 1414; the execution cluster 1460 perform the execute stage 1416; 6) the memory unit 1470 and the physical register file(s) unit(s) 1458 perform the write back/memory write stage 1418; 7) various units may be involved in the exception handling stage 1422; and 8) the retirement unit 1454 and the physical register file(s) unit(s) 1458 perform the commit stage 1424.

The core 1490 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In some embodiments, the core 1490 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1434/1474 and a shared L2 cache unit 1476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

The implementations are described with reference to providing isolation in virtualized systems using trust domains in specific integrated circuits, such as in computing platforms or micro-processing devices. The implementations may also be applicable to other types of integrated circuits and programmable logic devices. For example, the disclosed implementations are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processing device (DSP), a system on a chip, network computers (NetPC), set-top boxes, network hubs, wide area network (WAN) switches, or any other system that can perform the functions and operations taught below. It is described that the system can be any kind of computer or embedded system. The disclosed implementations may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but they may also relate to software optimizations for energy conservation and efficiency. As will become readily apparent in the description below, the implementations of methods, apparatuses, and systems described herein (whether in reference to hardware, firmware, software, or a combination thereof) are vital to a 'green technology' future balanced with performance considerations.

Set Guest Physical Address Mapping Attributes

TEEs (Trusted Execution Environments) for VMs (Virtual Machines) such as TDX discussed herein control the mapping of GPAs (Guest Physical Addresses) to HPAs (Host Physical Addresses). Besides address mapping, a GPA can be set with attributes, yet TDX maps all guest TD pages in the Secure EPT (SEPT) with fixed attributes, and all TD private pages are mapped in the SEPT as readable, writable, and executable, while special attributes such as Control-flow Enforcement Technology (CET) Supervisor Shadow Stack (SSS) are not enabled. A VM running in a TEE, such as a TD, manages its own page table and can set page attributes (e.g., readable/writable/executable, being SSS/HLAT pages, or any other page attributes) on its own and change a GPA page mapping (inadvertently or intentionally) to trigger a page remapping attack for the memory address space.

The TDX protects TDs from the host VMM (e.g., TDRM or root VMM 180) and other software in the platform that is not part of the TCB. Such TDX capability offers one level of protection of the TD, and it is desirable to have another level of protection to protect TDs from themselves. In this second level of protection, the page attribute at the GPA mapping level can be controlled to prevent a VM triggered page remapping attack at the corresponding TD. The additional level of protection adds depth in defending page remapping attack.

For example, the GPA page attribute can be set with read/write/execute permissions, so a TDX-aware TD kernel may protect some memory regions from being written by some ring 0 software (the most privileged software in the x86 architecture, or the highest exception level EL3 in the ARM architecture) within the TD. Additionally, a GPA page may be tagged as CET supervisor shadow stack. The attribute of supervisor shadow stack designates a GPA page used by the OS for shadow stacks as a supervisor shadow stack page, and shadow stack writes to such page mapped as supervisor shadow stack page in the secure EPT does not require the secure EPT to provide write permission. This allows the host VMM to write the supervisor shadow stack page (e.g., from CPU initiated stores or device DMA accesses when the secure EPT is shared by the IOMMU).

In some embodiments, the GPA translation attributes can be set in two phases. It can be set by the host VMM during the TD build phase. The attributes are measured and impact the TD attestation. It can also be set by a guest TD (e.g., TD 190A) during TD run times. The phases are explained herein below in details. Note that exemplary embodiments are explained using provisioning and updating attributes of private pages of a TD, but some embodiments may implement provisioning and updating attributes of pages that a TD shared with other TDs or VMM (e.g., pages in shared GPA space 506) by the host VMM or guest TD. Additionally, while the embodiments are described in terms of the TDX architecture, they may be implemented in similar TEE VM technologies that control GPA translation.

Host VMM Setting SEPT Attributes

A host VMM (e.g., TDRM or root VMM 180) may add private memory pages during TD build time, before the TD can run. This may be performed through a host VMM application programming interface (API) through which the host VMM launches and manages guest TDs, and the API may be referred to as a guest-host-communication interface (GHCI).

Figure 15:
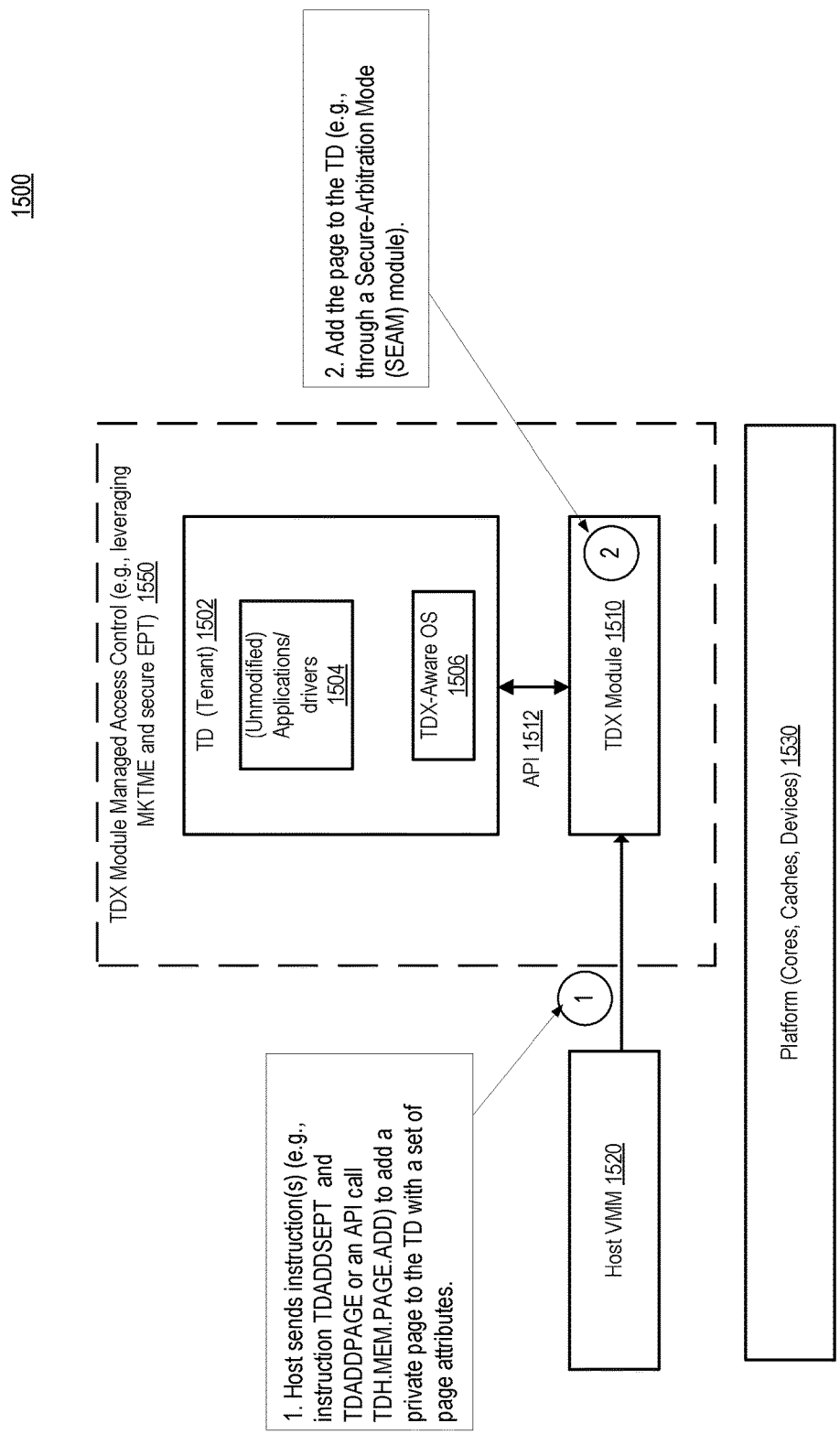
FIG. 15 illustrates a host VMM setting page attributes per some embodiments.

FIG. 15 illustrates a host VMM setting page attributes per some embodiments. The computing system 1500 is similar to the computing system 100 of FIG. 1A, and it includes a platform 1530 (such as cores, caches, or devices), a host VMM 1520 (such as TDRM or root VMM 180), and a TDX module managed access control environment 1550 (which may leverage MKTME and SEPT for protection). Task boxes 1 to 2 and corresponding cycles illustrate the order in which operations are performed according to some embodiments.

The environment 1550 may include one or more TDs such as TD 1502 (also referred to as a tenant or guest TD) and a TDX module 1510, and the communication between a TD and the TDX module 1510 is through an API such as API 1512 between TD 1502 and the TDX module 1510. TD 1502 includes applications and drivers 1504, which do not need to be modified for TD operations in some embodiments. TD 1502 further includes a TDX-aware operating system (OS) 1506 to interact with TDX module 1510. In some embodiments, secure-arbitration mode (SEAM), a mode of a processor to host TDX module 1510 is implemented. The TDX module 1510 may be hosted in a reserved, memory space identified by the SEAM-range register (SEAMRR). Under the design, the processor only allows access to SEAM-memory range to software executing inside the SEAM-memory range, and all other software accesses and direct-memory access (DMA) from devices to this memory range are aborted. SEAM may be also designed to not have any memory-access privileges to other protected, memory regions in the platform.

At task box 1, the host VMM 1520 sends one or more instructions to add a private page to TD 1502 with a set of page attributes. The private page is within the private address space 504 in some embodiments. The added page has a specified page size per instruction such as 4 KB, 2 MB, or 1 GB. Through one or more instructions, the host VMM 1520 may add private memory pages during TD build time, before the TD can run. The instructions may belong to the set of instructions (ISA of the processor) to allow the host VMM 1520 to manipulate the SEPT, as discussed herein relating to FIG. 8. For example, the instructions include TDADDSEPT 802 and TDADDPAGE 804 in some embodiments. Alternatively or additionally, the instructions may be one or more instructions within the API function calls. For example, the host VMM 1520 may issue a TDH.MEM.PAGE.ADD (TD host memory page add) instruction to add the private page to TD 1502. While the existing private memory page addition operation only measures the page's guest physical address and other attributes are set to constant values, the one or more instructions in some embodiments include a set of new page attributes as input parameter(s) to the one or more instructions, and thus allow SEPT attributes to be specified when the private page is added to the TD.

At task box 2, the TDX module 1510 adds the private page to the TD with the set of page attributes. The addition is through a secure-arbitration mode (SEAM) (a mode of a processor to host TDX module 1510) in some embodiments.

Figure 16:
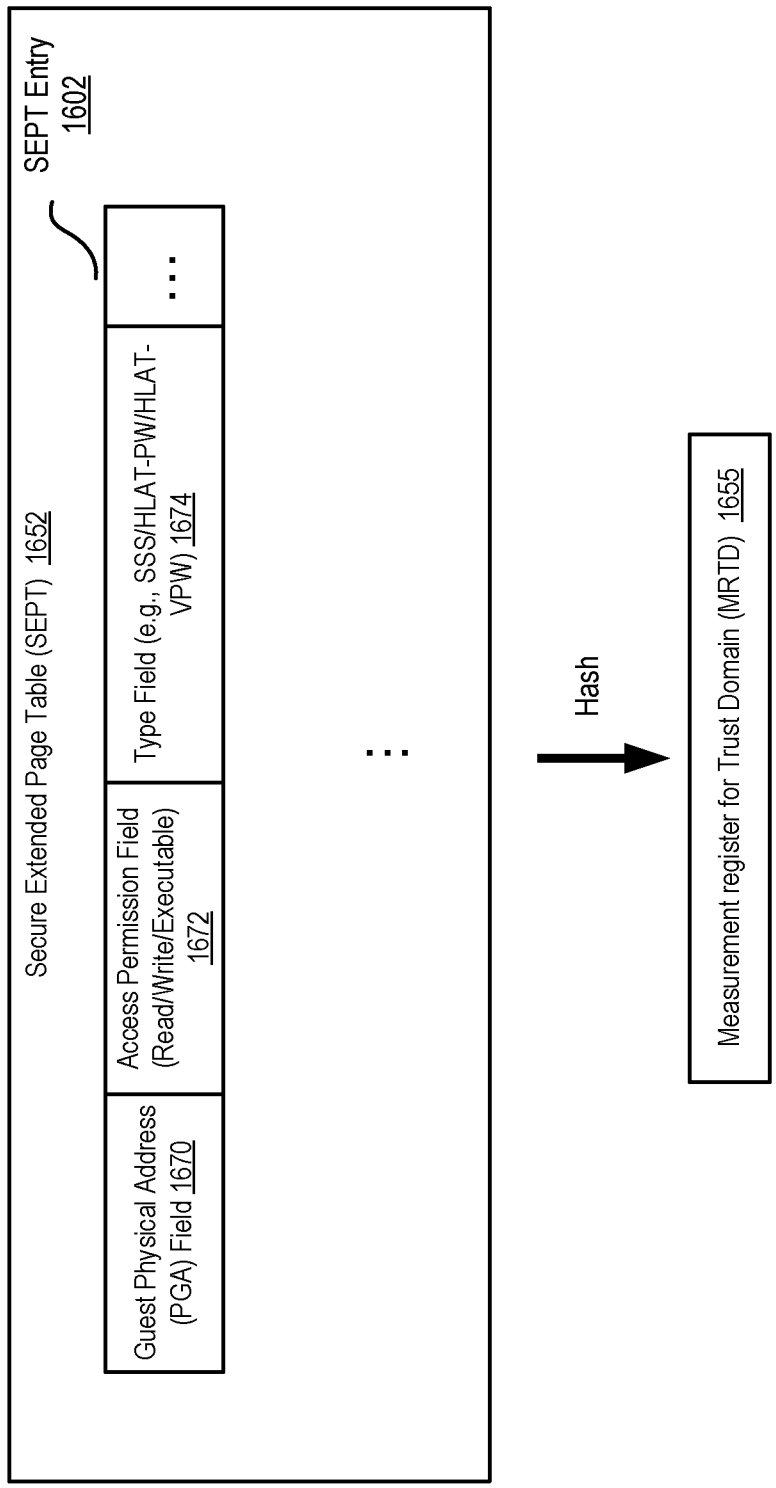
FIG. 16 illustrates storing a set of attributes mapped to a private page per some embodiments.

The added private page is mapped in the secure EPT of the corresponding processor with the set of page attributes. FIG. 16 illustrates storing a set of attributes mapped to a private page per some embodiments. The set of attributes of a private page provisioned by a host VMM (or a guest TD) may be stored as a secure EPT (SEPT) entry 1602 for the private page in a SEPT 1652. The SEPT 1652 is one of the SEPTs 334 in some embodiments. SEPT entry 1602 is mapped to the added private page, and SEPT 1652 is a tree-like structure composed of a number of pages (e.g., 4 KB pages, 2 MB pages, or pages with other page sizes). Each page holds a number of SEPT entries (e.g., 512 entries), where non-leaf entries point to further SEPT pages while leaf entries point to TD pages (see more discussion relating to create mapping 852). The number of TD pages (private or shared pages) is limited only by the memory size addressable by the processor.

SEPT entry 1602 for the provisioned private page includes multiple fields. including a field 1670 indicating the mapping guest physical address (GPA) of the private page. Additionally, SEPT entry 1602 also includes fields to indicate the set of attributes of the private page as provisioned. For example, SEPT entry 1602 may include an access permission field 1672 indicating the private page being provisioned as readable, writable, or executable (instead of a default fixed page type).

Additionally, SEPT entry 1602 may also include a type field 1674 indicating whether the private page is a special type. For example, the private page may store a supervisor shadow stack and the type field 1672 indicates as such. Furthermore, the private page may be a type of hypervisor-managed linear address translation (HLAT) page.

The private page may be provisioned as a paging-write HLAT (HLAT-PW) page, which holds HLAT or legacy IA paging structures so that the processor can use the Paging-Write as permission to perform A/D (access/dirty) bit writes (instead of the software write permission in the EPTE). The HLAT-PW page allows the operating system (OS) and VMM to mark pages as read-only and yet the processor can still walk these pages during address translation and set the A/D bits during page walk or store operations.

The private page may be provisioned as a verify paging-write (HLAT-VPW) page, which should only be referenced via translation (guest) paging structures that are marked as paging writable under EPT. The HLAT-VPW page enforces that the page can only be reached via paging structures, while HLAT-PW may be set for each page structures and hence mitigate the page alias attacks, such that the same page cannot be aliased from paging structures where PW has not been set and can then be accessed/modified via alternate address.

SEPT entry 1602 may include additional fields to store other attributes of a provisioned private page when the other attributes aid the protection of the private page from the corresponding TD (or other TDs and host VMM). Each of these fields includes one or more bits, and a set of bits in a field indicates an attribute value. For example, setting one bit to one (or zero in some embodiments) in the type field 1674 indicates that the corresponding private page is a HLAT-PW page, while setting another bit to one (or zero in some embodiments) in the type field 1674 indicates that the corresponding private page is a HLAT-VPW page.

Figure 17:
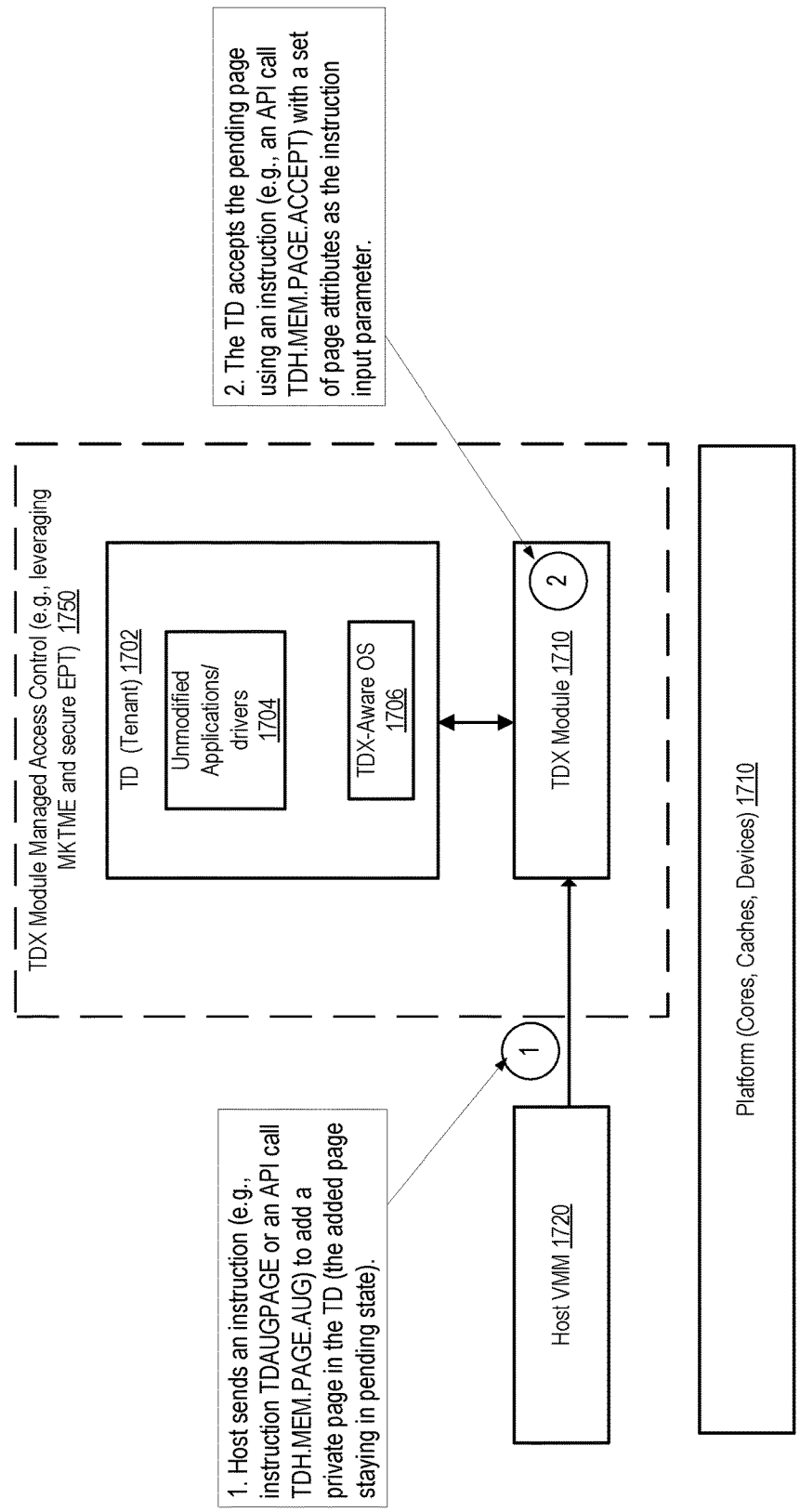
FIG. 17 illustrates a guest TD setting page attributes per some embodiments.

The content of SEPT 1652 (including information of the SEPT entries within) may be authenticated through a register for trust domain such as measurement register of trust domain (MRTD). The information of the SEPT entries, including the GPA, access permission, and type information, are hashed through a cryptographic function, and the hash results are stored in the MRTD register. The MRTD register helps provide static measurement of the TD build process and the initial content of the TD and the measurement, including the provisioned private page attributes, is included in the TD's attestation (e.g., the TDREPORT structure). Only correct setting of the attributes will result in a correct MRTD values that passes attestation verification by a third party. Note that prior to the operations in task boxes 1 and 2, TD 1502 is established Guest TD Setting SEPT Attributes Additionally, a guest TD may set the SEPT attributes during TD run time. The TDX architecture supports dynamically adding private pages to a TD, and new SEPT attributes (e.g., the ones shown in SEPT entry 1602) may be provisioned by the guest TD. FIG. 17 illustrates a host VMM setting page attributes per some embodiments. FIG. 17 is similar to FIG. 15, and similar reference numbers indicating that the corresponding entities perform same similar operations. Task boxes 1 to 2 and corresponding cycles illustrate the order in which operations are performed according to some embodiments.

At task box 1, the host VMM 1720 sends an instruction (e.g., a TDAUGPAGE instruction 806 or a TDH.MEM.PAGE.AUG API function call) to TDX module 1710 to add a private page of TD 1702. The added page has a specified page size per instruction such as 4 KB, 2 MB, or 1 GB. The page mapping is added to the TD's Secure EPT, but the page's Secure EPT entry is put in a PENDING state. In this state, the page is not accessible to TD 1702. The page pending state is indicated by page state 163 of MOT 160 in some embodiments. Note as explained herein above relating to the TDAUGPAGE instruction 806, the page content is set to zero.

At task box 2, TD 1702 accepts the pending page through an instruction (e.g., a TDG.MEM.PAGE.ACCEPT API function call). TD 1702, instead of setting up the corresponding SEPT (e.g., SEPT 1602) with the default attribute, specifies a set of page attributes as the instruction input parameters so that the instruction may set the private page with the specified attributes, including the ones in SEPT 1602.

Figure 18:
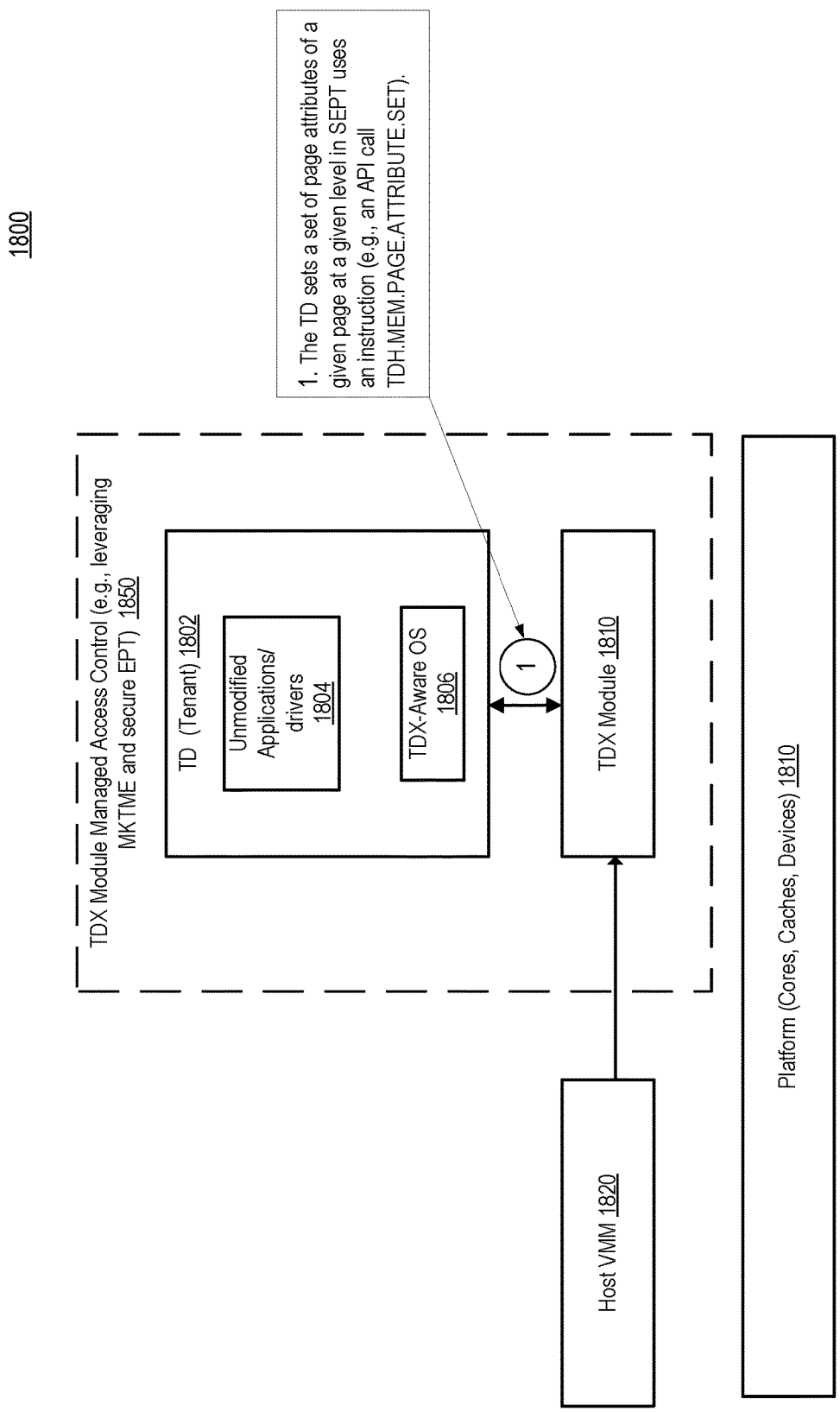
FIG. 18 illustrates a guest TD setting page attributes per additional embodiments.

Through the acceptance instruction with desired attributes specified in the instruction, TD 1702 may dynamically add private pages with desired attributes at run time. Additionally, TD 1702 may update attributes of a private page at run time. FIG. 18 illustrates a guest TD setting page attributes per additional embodiments. FIG. 18 is similar to FIG. 15, and similar reference numbers indicating that the corresponding entities perform same similar operations.

At task box 1, guest TD 1850 may set a set of page attributes of a given page using an instruction (e.g., a TDG.MEM.PAGE.ATTRIBUTES.SET API function call). The instruction may include a set of page attributes at a given mapping level as input parameters to identify the page for which the page attributes are to be updated. The mapping level indicates how deep to walk the corresponding SEPT for the page, e.g., level 0 indicating a 4 KB page, level 1 indicating a 2 MB page, and level 2 indicating a 1 GB page.

In executing the instruction, the processor identifies the SEPT entry for the private page based on the input parameters. If a SEPT entry matching the mapping level is identified, the set of page attributes specified in the input parameters is set to the private page. However, if the page is not mapped at the requested level (e.g., the GPA is mapped by a PDE (2 MB) Secure EPT entry but the instruction from guest TD 1802 requests an update at a 4 KB level), the instruction may fail with an error code, which may indicate the reason of the failure in some embodiments.

Upon the SEPT entry for the private page being updated by the guest TD 1702 or 1802, the updated information of the SEPT is hashed through the cryptographic function again, and the hash results are updated in the MRTD register 1655 as well so that the MRTD register 1655 may be used for the TD's attestation.

Through these instructions, either a host VMM or a guest TD may set page attributes of a private page (and a shared page), in TD build time or TD run time. Such page attribute setting using instructions allows TEEs (Trusted Execution Environments) for VMs (Virtual Machines) control TD pages at the GPA mapping level, and such control offer an additional level of defense to prevent a TD from engaging page remapping attacks for the memory address space (inadvertently or intentionally).

Operations in Some Embodiments

Figure 19:
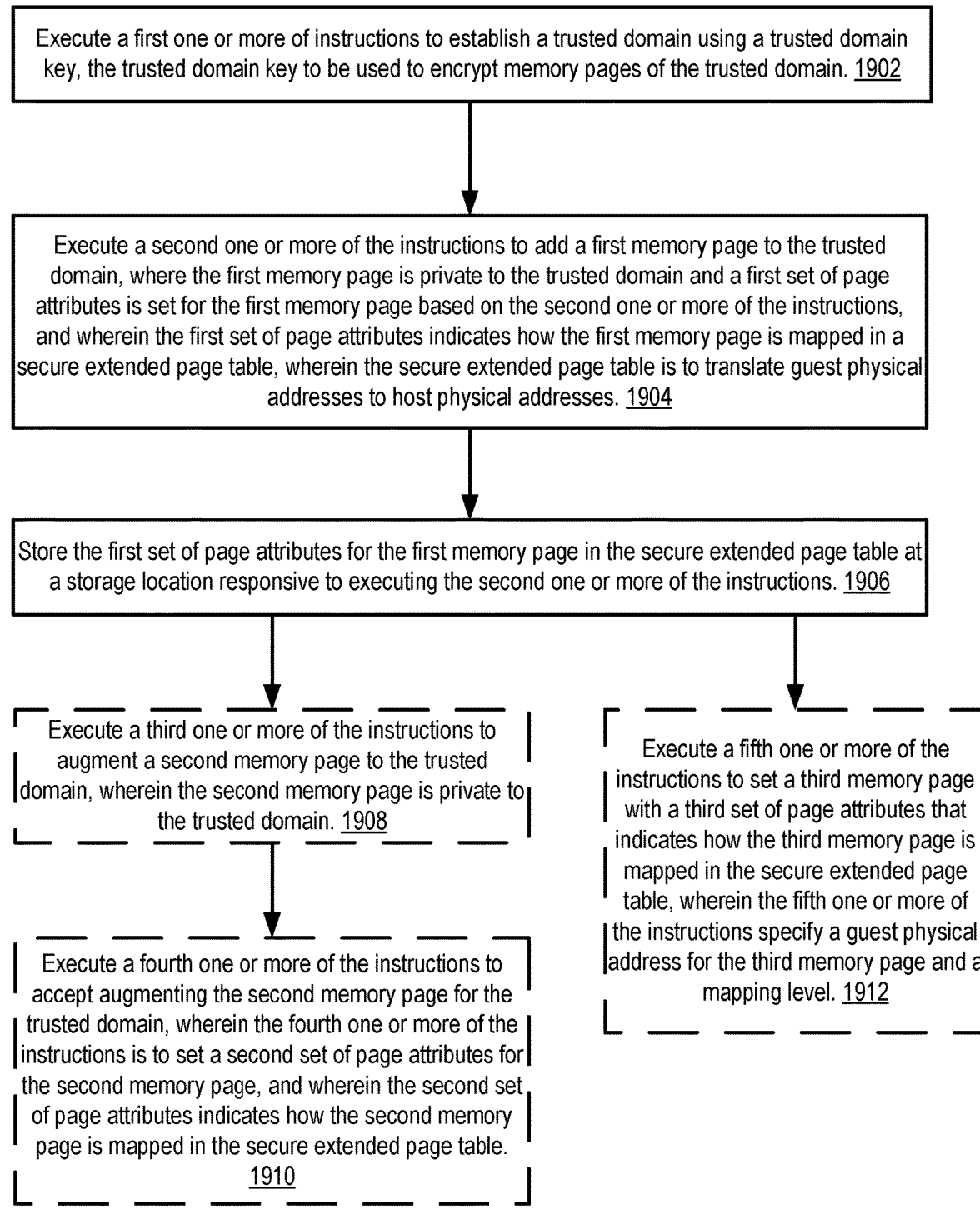
FIG. 19 illustrates an example logic flow of setting page attributes per some embodiments.

FIG. 19 illustrates an example logic flow of setting page attributes per some embodiments. The operations of flow 1900 are performed by a processor such as processor 112 or processing device 1302, and the instructions to be executed by execution circuitry/logic 1416/1450 may be decoded first by a decoder/decoding circuitry/decode logic 1406.

At reference 1902, a first one or more of instructions are executed to establish a trusted domain using a trusted domain key, the trusted domain key to be used to encrypt memory pages of the trusted domain. The first one or more instructions comprises instruction TDCREATE in some embodiments.

At reference 1904, a second one or more of instructions are executed to add a first memory page to the trusted domain, where the first memory page is private to the trusted domain and a first set of page attributes is set for the first memory page based on the second one or more of the instructions, where the first set of page attributes indicates how the first memory page is mapped in a secure extended page table, and where the secure extended page table is to translate guest physical addresses to host physical addresses. The second one or more instructions comprises instructions TDADDSEPT 802 and TDADDPAGE 804, and/or the TDH.MEM.PAGE.ADD instruction.

At reference 1906, the first set of page attributes for the first memory page is stored in the secure extended page table at a storage location responsive to executing the second one or more of the instructions. The storage location is a range of a physical memory that stores SEPT 334 or SEPT 1652 in some embodiments.

In some embodiments, the first set of page attributes is to indicate the first memory page to be readable, writable, or executable.

In some embodiments, the first set of page attributes is to indicate the first memory page to be a type within a set of memory page types including a type of supervisor shadow stack or a type of hypervisor-managed linear address translation (HLAT) page. In some embodiments, the type of HLAT page is a HLAT paging-write (HLAT-PW) page or a HLAT verify paging-write (HLAT-VPW) page.

Optionally, the operations of flow 1900 continue, and a third one or more of the instructions are executed at reference 1908 to augment a second memory page to the trusted domain, where the second memory page is private to the trusted domain. At reference 1910, a fourth one or more of the instructions are executed to accept augmenting the second memory page for the trusted domain, where the fourth one or more of the instructions is to set a second set of page attributes for the second memory page, and where the second set of page attributes indicates how the second memory page is mapped in the secure extended page table. In some embodiments, the trusted domain determines to accept augmenting the second memory page for the trusted domain prior to executing the fourth one or more of the instructions. The details of the operations are discussed herein (e.g., relating to FIG. 17).

Optionally and alternatively, the operations of flow 1900 continues to reference 1912, where a fifth one or more of the instructions are executed to set a third memory page with a third set of page attributes that indicates how the third memory page is mapped in the secure extended page table, wherein the fifth one or more of the instructions specify a guest physical address for the third memory page and a mapping level. The details of the operations are discussed herein (e.g., relating to FIG. 18).

In some embodiments, an error is returned upon a determination of mapping level mismatch between the one of the third memory page and what is specified by the fifth one or more of the instructions.

FURTHER EXAMPLES

Example 1 provides an exemplary apparatus to set guest physical address mapping attributes for a trusted domain. The apparatus comprises execution circuitry to execute a first one or more of instructions to establish a trusted domain using a trusted domain key, the trusted domain key to be used to encrypt memory pages of the trusted domain. The execution circuitry is further to execute a second one or more of the instructions to add a first memory page to the trusted domain, wherein the first memory page is private to the trusted domain and a first set of page attributes is set for the first memory page based on the second one or more of the instructions, and wherein the first set of page attributes indicates how the first memory page is mapped in a secure extended page table, wherein the secure extended page table is to translate guest physical addresses to host physical addresses. The apparatus further comprises a storage location to store the first set of page attributes for the first memory page in the secure extended page table responsive to executing the second one or more of the instructions.

Example 2 includes the substance of Example 1, wherein the first set of page attributes is to indicate the first memory page to be readable, writable, or executable.

Example 3 includes the substance of Example 1 to 2, wherein the first set of page attributes is to indicate the first memory page to be a type within a set of memory page types including a type of supervisor shadow stack or a type of hypervisor-managed linear address translation (HLAT) page.

Example 4 includes the substance of Examples 1 to 3, wherein the type of HLAT page is a HLAT paging-write (HLAT-PW) page or a HLAT verify paging-write (HLAT-VPW) page.

Example 5 includes the substance of Examples 1 to 4, wherein the execution circuitry is to execute a third one or more of the instructions to augment a second memory page to the trusted domain, wherein the second memory page is private to the trusted domain.

Example 6 includes the substance of Examples 1 to 5, wherein the execution circuitry is to execute a fourth one or more of the instructions to accept augmenting the second memory page for the trusted domain, wherein the fourth one or more of the instructions is to set a second set of page attributes for the second memory page, and wherein the second set of page attributes indicates how the second memory page is mapped in the secure extended page table.

Example 7 includes the substance of Examples 1 to 6, wherein the trusted domain determines to accept augmenting the second memory page for the trusted domain prior to executing the fourth one or more of the instructions.

Example 8 includes the substance of Examples 1 to 7, wherein the execution circuitry executes a fifth one or more of the instructions to set a third memory page with a third set of page attributes that indicates how the third memory page is mapped in the secure extended page table, wherein the fifth one or more of the instructions specify a guest physical address for the third memory page and a mapping level.

Example 9 includes the substance of Examples 1 to 8, wherein an error is returned upon a determination of mapping level mismatch between the one of the third memory page and what is specified by the fifth one or more of the instructions.

Example 10 provides an exemplary method to set guest physical address mapping attributes for a trusted domain. The method includes executing a first one or more of instructions to establish a trusted domain using a trusted domain key, the trusted domain key to be used to encrypt memory pages of the trusted domain. The method further includes executing a second one or more of the instructions to add a first memory page to the trusted domain, wherein the first memory page is private to the trusted domain and a first set of page attributes is set for the first memory page based on the second one or more of the instructions, wherein the first set of page attributes indicates how the first memory page is mapped in a secure extended page table, and wherein the secure extended page table is to translate guest physical addresses to host physical addresses. The method further includes storing the first set of page attributes for the first memory page in the secure extended page table at a storage location responsive to executing the second one or more of the instructions.

Example 11 includes the substance of Example 10, wherein the first set of page attributes is to indicate the first memory page to be a type within a set of memory page types including a type of supervisor shadow stack or hypervisor-managed linear address translation page.

Example 12 includes the substance of Examples 10 to 11, further comprising: executing a third one or more of the instructions to augment a second memory page to the trusted domain, wherein the second memory page is private to the trusted domain.

Example 13 includes the substance of Examples 10 to 12, further comprising: executing a fourth one or more of the instructions to accept augmenting the second memory page for the trusted domain, wherein the fourth one or more of the instructions is to set a second set of page attributes for the second memory page, and wherein the second set of page attributes indicates how the second memory page is mapped in the secure extended page table.

Example 14 includes the substance of Examples 10 to 13, wherein the trusted domain determines to accept augmenting the second memory page for the trusted domain prior to executing the fourth one or more of the instructions.

Example 15 includes the substance of Examples 10 to 14, further comprising: executing a fifth one or more of the instructions to set a third memory page with a third set of page attributes that indicates how the third memory page is mapped in the secure extended page table, wherein the fifth one or more of the instructions specify a guest physical address for the third memory page and a mapping level.

Example 16 provides an exemplary computer-readable storage medium storing instructions that when executed by a processor of a computing system, are capable of causing the computing system to perform: executing a first one or more of instructions to establish a trusted domain using a trusted domain key, the trusted domain key to be used to encrypt memory pages within of the trusted domain; executing a second one or more of the instructions to add a first memory page to the trusted domain, wherein the first memory page is private to the trusted domain and a first set of page attributes is set for the first memory page based on the second one or more of the instructions, wherein the first set of page attributes indicates how the first memory page is mapped in a secure extended page table, and wherein the secure extended page table is to translate guest physical addresses to host physical addresses; and storing the first set of page attributes for the first memory page in the secure extended page table at a storage location responsive to executing the second one or more of the instructions.

Example 17 includes the substance of Example 16, wherein the first set of page attributes is to indicate the first memory page to be readable, writable, or executable.

Example 18 includes the substance of Examples 16 to 17, wherein the first set of page attributes is to indicate the first memory page to be a type within a set of memory page types including a type of supervisor shadow stack or a type of hypervisor-managed linear address translation (HLAT) page.

Example 19 includes the substance of Examples 16 to 18, wherein the computing system is capable of being caused to further perform: executing a third one or more of the instructions to augment a second memory page to the trusted domain, wherein the second memory page is private to the trusted domain.

Example 20 includes the substance of Examples 16 to 19, wherein the computing system is capable of being caused to further perform: executing a fourth one or more of the instructions to accept augmenting the second memory page for the trusted domain, wherein the fourth one or more of the instructions is to set a second set of page attributes for the second memory page, and wherein the second set of page attributes indicates how the second memory page is mapped in the secure extended page table.

Example 21 provides an exemplary apparatus to set guest physical address mapping attributes for a trusted domain. The apparatus comprises execution means to execute a first one or more of instructions to establish a trusted domain using a trusted domain key, the trusted domain key to be used to encrypt memory pages of the trusted domain. The execution means is further to execute a second one or more of the instructions to add a first memory page to the trusted domain, wherein the first memory page is private to the trusted domain and a first set of page attributes is set for the first memory page based on the second one or more of the instructions, and wherein the first set of page attributes indicates how the first memory page is mapped in a secure extended page table, wherein the secure extended page table is to translate guest physical addresses to host physical addresses. The apparatus further comprises a storage location to store the first set of page attributes for the first memory page in the secure extended page table responsive to executing the second one or more of the instructions.

Example 22 includes the substance of Example 21, wherein the first set of page attributes is to indicate the first memory page to be readable, writable, or executable.

Example 23 includes the substance of Examples 21 to 22, wherein the first set of page attributes is to indicate the first memory page to be a type within a set of memory page types including a type of supervisor shadow stack or a type of hypervisor-managed linear address translation (HLAT) page.

Example 24 includes the substance of Examples 21 to 23, wherein the type of HLAT page is a HLAT paging-write (HLAT-PW) page or a HLAT verify paging-write (HLAT-VPW) page.

Example 25 includes the substance of Examples 21 to 24, wherein the execution means is to execute a third one or more of the instructions to augment a second memory page to the trusted domain, wherein the second memory page is private to the trusted domain.

Example 26 includes the substance of Examples 21 to 25, wherein the execution means is to execute a fourth one or more of the instructions to accept augmenting the second memory page for the trusted domain, wherein the fourth one or more of the instructions is to set a second set of page attributes for the second memory page, and wherein the second set of page attributes indicates how the second memory page is mapped in the secure extended page table.

Example 27 includes the substance of Examples 21 to 26, wherein the trusted domain determines to accept augmenting the second memory page for the trusted domain prior to executing the fourth one or more of the instructions.

Example 28 includes the substance of Examples 21 to 27, wherein the execution means executes a fifth one or more of the instructions to set a third memory page with a third set of page attributes that indicates how the third memory page is mapped in the secure extended page table, wherein the fifth one or more of the instructions specify a guest physical address for the third memory page and a mapping level.

Example 29 includes the substance of Examples 21 to 28, wherein an error is returned upon a determination of mapping level mismatch between the one of the third memory page and what is specified by the fifth one or more of the instructions.

ADDITIONAL EXPLANATION

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical, or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well-known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
   execution circuitry to execute a first one or more of instructions to establish a trusted domain using a trusted domain key, the trusted domain key to be used to encrypt memory pages of the trusted domain, and the execution circuitry to execute a second one or more of the instructions to add a first memory page to the trusted domain, wherein the first memory page is private to the trusted domain and a first set of page attributes is set for the first memory page based on the second one or more of the instructions, and wherein the first set of page attributes indicates how the first memory page is mapped in a secure extended page table, wherein the secure extended page table is to translate guest physical addresses to host physical addresses, wherein the first set of page attributes is to indicate the first memory page to be a type within a set of memory page types including a type of supervisor shadow stack or a type of hypervisor-managed linear address translation (HLAT) page, and wherein the type of HLAT page is a HLAT paging-write (HLAT-PW) page or a HLAT verify paging-write (HLAT-VPW) page; and
   a storage location to store the first set of page attributes for the first memory page in the secure extended page table responsive to executing the second one or more of the instructions.

2. The apparatus of claim 1, wherein the first set of page attributes is to indicate the first memory page to be readable, writable, or executable.

3. The apparatus of claim 1, wherein the execution circuitry is to execute a third one or more of the instructions to augment a second memory page to the trusted domain, wherein the second memory page is private to the trusted domain.

4. The apparatus of claim 3, wherein the execution circuitry is to execute a fourth one or more of the instructions to accept augmenting the second memory page for the trusted domain, wherein the fourth one or more of the instructions is to set a second set of page attributes for the second memory page, and wherein the second set of page attributes indicates how the second memory page is mapped in the secure extended page table.

5. The apparatus of claim 4, wherein the trusted domain determines to accept augmenting the second memory page for the trusted domain prior to executing the fourth one or more of the instructions.

6. The apparatus of claim 1, wherein the execution circuitry executes a fifth one or more of the instructions to set a third memory page with a third set of page attributes that indicates how the third memory page is mapped in the secure extended page table, wherein the fifth one or more of the instructions specify a guest physical address for the third memory page and a mapping level.

7. The apparatus of claim 6, wherein an error is returned upon a determination of mapping level mismatch between that of the third memory page and what is specified by the fifth one or more of the instructions.

8. A method comprising:
   executing a first one or more of instructions to establish a trusted domain using a trusted domain key, the trusted domain key to be used to encrypt memory pages of the trusted domain;
   executing a second one or more of the instructions to add a first memory page to the trusted domain, wherein the first memory page is private to the trusted domain and a first set of page attributes is set for the first memory page based on the second one or more of the instructions, wherein the first set of page attributes indicates how the first memory page is mapped in a secure extended page table, and wherein the secure extended page table is to translate guest physical addresses to host physical addresses;

storing the first set of page attributes for the first memory page in the secure extended page table at a storage location responsive to executing the second one or more of the instructions;

executing a third one or more of the instructions to augment a second memory page to the trusted domain, wherein the second memory page is private to the trusted domain; and executing a fourth one or more of the instructions to accept augmenting the second memory page for the trusted domain, wherein the fourth one or more of the instructions is to set a second set of page attributes for the second memory page, wherein the second set of page attributes indicates how the second memory page is mapped in the secure extended page table, and wherein the trusted domain determines to accept augmenting the second memory page for the trusted domain prior to executing the fourth one or more of the instructions.

9. The method of claim 8, wherein the first set of page attributes is to indicate the first memory page to be a type within a set of memory page types including a type of supervisor shadow stack or hypervisor-managed linear address translation page.

10. The method of claim 8, further comprising:

executing a fifth one or more of the instructions to set a third memory page with a third set of page attributes that indicates how the third memory page is mapped in the secure extended page table, wherein the fifth one or more of the instructions specify a guest physical address for the third memory page and a mapping level.

11. A non-transitory computer-readable storage medium storing code that when executed by a computing system, is capable of causing the computing system to perform:

executing a first one or more of instructions to establish a trusted domain using a trusted domain key, the trusted domain key to be used to encrypt memory pages of the trusted domain;

executing a second one or more of the instructions to add a first memory page to the trusted domain, wherein the first memory page is private to the trusted domain and a first set of page attributes is set for the first memory page based on the second one or more of the instructions, wherein the first set of page attributes indicates how the first memory page is mapped in a secure extended page table, and wherein the secure extended page table is to translate guest physical addresses to host physical addresses;

storing the first set of page attributes for the first memory page in the secure extended page table at a storage location responsive to executing the second one or more of the instructions;

executing a third one or more of the instructions to augment a second memory page to the trusted domain, wherein the second memory page is private to the trusted domain; and executing a fourth one or more of the instructions to accept augmenting the second memory page for the trusted domain, wherein the fourth one or more of the instructions is to set a second set of page attributes for the second memory page, wherein the second set of page attributes indicates how the second memory page is mapped in the secure extended page table, and wherein the trusted domain determines to accept augmenting the second memory page for the trusted domain prior to executing the fourth one or more of the instructions.

12. The non-transitory computer-readable storage medium of claim 11, wherein the first set of page attributes is to indicate the first memory page to be readable, writable, or executable.

13. The non-transitory computer-readable storage medium of claim 11, wherein the first set of page attributes is to indicate the first memory page to be a type within a set of memory page types including a type of supervisor shadow stack or a type of hypervisor-managed linear address translation (HLAT) page.

* * * * *